US006574661B1

(12) United States Patent
Delano et al.

(10) Patent No.: US 6,574,661 B1
(45) Date of Patent: Jun. 3, 2003

(54) INTEGRATED PROXY INTERFACE FOR WEB BASED TELECOMMUNICATION TOLL-FREE NETWORK MANAGEMENT USING A NETWORK MANAGER FOR DOWNLOADING A CALL ROUTING TREE TO CLIENT

(75) Inventors: P. Alex Delano, Colorado Springs, CO (US); Carol Y. Devine, Colorado Springs, CO (US); Robert W. Hall, Colorado Springs, CO (US); Robert A. Pfister, Colorado Springs, CO (US); Garrison M. Venn, Breckenridge, CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/159,702

(22) Filed: Sep. 24, 1998

Related U.S. Application Data

(60) Provisional application No. 60/060,655, filed on Sep. 26, 1997.

(51) Int. Cl.[7] .......................... G06F 15/173; G06F 15/17
(52) U.S. Cl. .......................... 709/223; 379/219; 379/235; 379/267; 709/226; 709/229; 709/244; 709/224
(58) Field of Search .............................. 379/219–235, 379/261–267, 88.19–88.21; 709/223, 226, 229, 244, 224

(56) References Cited

U.S. PATENT DOCUMENTS

| 4,160,129 A | 7/1979 | Peyser et al. |
| 4,345,315 A | 8/1982 | Cadotte et al. |
| 4,817,050 A | 3/1989 | Komatsu et al. |
| 4,823,373 A | 4/1989 | Takahashi et al. |
| 4,893,248 A | 1/1990 | Pitts et al. |
| 4,972,504 A | 11/1990 | Daniel, Jr. et al. |
| 5,041,972 A | 8/1991 | Frost |
| 5,075,771 A | 12/1991 | Hashimoto |
| 5,131,020 A | 7/1992 | Liebesny et al. |

(List continued on next page.)

FOREIGN PATENT DOCUMENTS

| EP | 0 809 387 A2 | 5/1997 |
| JP | 09064870 A | 3/1997 |
| WO | WO97/11443 | 3/1997 |
| WO | WO 97/16911 | 5/1997 |
| WO | WO 97/23988 | 7/1997 |
| WO | WO 98/19472 | 5/1998 |
| WO | WO 99/01826 | 1/1999 |

OTHER PUBLICATIONS

*Computer Networks*, Andrew S. Tanenbaum, pp. 410–412.
"XIIR6.3 (Broadway) Overview", http://www.x.org/broadway.htm.

(List continued on next page.)

*Primary Examiner*—Kenneth R. Coulter
*Assistant Examiner*—Paul Kang

(57) ABSTRACT

A Web/Internet based toll-free network management tool that enables customers of telecommunications network providers to modify the configuration of their toll-free networks via a Web/Internet-based graphical user interface. The tool provides customers Web/Internet access to toll-free call routing plans and associated routing plan details via a secure Web/Internet-based connection, and additionally provides a customer with the ability to specify implementation of a specific call routing plan for a toll-free number at a predetermined time, and the ability to re-configure an existing call routing plan. Additionally, the tool enables a roll-back of a particular call-routing plan or call plan detail to a prior configuration at a user-specified time.

34 Claims, 15 Drawing Sheets

U.S. PATENT DOCUMENTS

| | | |
|---|---|---|
| 5,136,707 A | 8/1992 | Block et al. |
| 5,223,699 A | 6/1993 | Flynn et al. |
| 5,228,076 A | 7/1993 | Hopner et al. |
| 5,245,533 A | 9/1993 | Marshall |
| 5,262,760 A | 11/1993 | Iwamura et al. |
| 5,285,494 A | 2/1994 | Sprecher et al. |
| 5,287,270 A | 2/1994 | Hardy et al. |
| 5,313,598 A | 5/1994 | Yamakawa |
| 5,315,093 A | 5/1994 | Stewart |
| 5,325,290 A | 6/1994 | Cauffman et al. |
| 5,327,486 A | 7/1994 | Wolff et al. |
| 5,361,259 A | 11/1994 | Hunt et al. |
| 5,369,571 A | 11/1994 | Metts |
| 5,452,446 A | 9/1995 | Johnson |
| 5,475,836 A | 12/1995 | Harris et al. |
| 5,481,542 A | 1/1996 | Logston et al. |
| 5,483,596 A | 1/1996 | Rosenow et al. |
| 5,490,060 A | 2/1996 | Malec et al. |
| 5,491,779 A | 2/1996 | Bezjian |
| 5,506,893 A | 4/1996 | Buscher et al. |
| 5,526,257 A | 6/1996 | Lerner |
| 5,530,744 A | 6/1996 | Charalambous et al. |
| 5,533,108 A | 7/1996 | Harris et al. |
| 5,537,611 A | 7/1996 | Rajagopal et al. |
| 5,539,734 A | 7/1996 | Burwell et al. |
| 5,548,726 A | 8/1996 | Pettus |
| 5,551,025 A | 8/1996 | O'Reilly et al. |
| 5,555,290 A | 9/1996 | McLeod et al. |
| 5,563,805 A | 10/1996 | Arbuckle et al. |
| 5,586,260 A | 12/1996 | Hu |
| 5,602,918 A | 2/1997 | Chen et al. |
| 5,610,915 A | 3/1997 | Elliott et al. |
| 5,621,727 A | 4/1997 | Vaudreuil |
| 5,623,601 A | 4/1997 | Vu |
| 5,630,066 A | 5/1997 | Gosling |
| 5,649,182 A | 7/1997 | Reitz |
| 5,650,994 A | 7/1997 | Daley |
| 5,659,601 A | 8/1997 | Cheslog |
| 5,666,481 A | 9/1997 | Lewis |
| 5,671,354 A | 9/1997 | Ito et al. |
| 5,689,645 A | 11/1997 | Schettler et al. |
| 5,692,030 A | 11/1997 | Teglovic et al. |
| 5,692,181 A | 11/1997 | Anand et al. |
| 5,694,546 A | 12/1997 | Reisman |
| 5,696,906 A | 12/1997 | Peters et al. |
| 5,699,403 A | 12/1997 | Ronnen |
| 5,699,528 A | 12/1997 | Hogan |
| 5,706,502 A | 1/1998 | Foley et al. |
| 5,708,780 A | 1/1998 | Levergood et al. |
| 5,710,882 A | 1/1998 | Svennevik et al. |
| 5,721,908 A | 2/1998 | Lagarde et al. |
| 5,721,913 A | 2/1998 | Ackroff et al. |
| 5,727,129 A | 3/1998 | Barrett et al. |
| 5,734,709 A | 3/1998 | DeWitt et al. |
| 5,734,831 A | 3/1998 | Sanders |
| 5,742,762 A | 4/1998 | Scholl et al. |
| 5,742,763 A | 4/1998 | Jones |
| 5,742,768 A | 4/1998 | Gennaro et al. |
| 5,742,905 A | 4/1998 | Pepe et al. |
| 5,745,754 A | 4/1998 | Lagarde et al. |
| 5,754,830 A | 5/1998 | Butts et al. |
| 5,757,900 A | 5/1998 | Nagal et al. |
| 5,764,756 A | 6/1998 | Onweller |
| 5,768,501 A | 6/1998 | Lewis |
| 5,774,660 A | 6/1998 | Brendel et al. |
| 5,778,178 A | 7/1998 | Arunachalam |
| 5,778,377 A | 7/1998 | Marlin et al. |
| 5,781,550 A | 7/1998 | Templin et al. |
| 5,781,632 A | 7/1998 | Odom |
| 5,787,160 A | 7/1998 | Chaney et al. |
| 5,787,412 A | 7/1998 | Bosch et al. |
| 5,790,780 A | 8/1998 | Brichta et al. |
| 5,790,789 A | 8/1998 | Suarez |
| 5,790,797 A | 8/1998 | Shimada et al. |
| 5,790,809 A | 8/1998 | Holmes |
| 5,793,694 A | 8/1998 | Rogers et al. |
| 5,793,762 A | 8/1998 | Penners et al. |
| 5,793,964 A | 8/1998 | Rogers et al. |
| 5,796,393 A | 8/1998 | MacNaughton et al. |
| 5,799,154 A | 8/1998 | Kuriyan |
| 5,802,320 A | 9/1998 | Baehr et al. |
| 5,805,803 A | 9/1998 | Birrell et al. |
| 5,812,533 A | 9/1998 | Cox et al. |
| 5,812,654 A * | 9/1998 | Anderson et al. |
| 5,815,080 A | 9/1998 | Taguchi |
| 5,815,665 A | 9/1998 | Teper et al. |
| 5,819,225 A | 10/1998 | Eastwood et al. |
| 5,819,271 A | 10/1998 | Mahoney et al. |
| 5,825,769 A | 10/1998 | O'Reilly et al. |
| 5,825,890 A | 10/1998 | Elgamal et al. |
| 5,826,029 A | 10/1998 | Gore, Jr. et al. |
| 5,826,269 A | 10/1998 | Hussey |
| 5,832,519 A | 11/1998 | Bowen et al. |
| 5,835,084 A | 11/1998 | Bailey et al. |
| 5,844,896 A | 12/1998 | Marks et al. |
| 5,845,067 A | 12/1998 | Porter et al. |
| 5,845,267 A | 12/1998 | Ronen |
| 5,848,233 A | 12/1998 | Radia et al. |
| 5,848,396 A | 12/1998 | Gerace |
| 5,848,399 A | 12/1998 | Burke |
| 5,850,517 A | 12/1998 | Verkler et al. |
| 5,852,810 A | 12/1998 | Sotiroff et al. |
| 5,852,812 A | 12/1998 | Reeder |
| 5,862,325 A | 1/1999 | Reed et al. |
| 5,867,495 A | 2/1999 | Elliott et al. |
| 5,870,558 A * | 2/1999 | Branton, Jr. et al. ......... 709/224 |
| 5,875,236 A | 2/1999 | Jankowitz et al. |
| 5,877,759 A | 3/1999 | Bauer |
| 5,881,237 A | 3/1999 | Schwaller et al. |
| 5,883,948 A | 3/1999 | Dunn |
| 5,884,032 A | 3/1999 | Bateman et al. |
| 5,884,312 A | 3/1999 | Dustan et al. |
| 5,892,900 A | 4/1999 | Ginter et al. |
| 5,907,681 A | 5/1999 | Bates et al. |
| 5,909,679 A | 6/1999 | Hall |
| 5,909,682 A | 6/1999 | Cowan et al. |
| 5,915,001 A * | 6/1999 | Uppaluru ..................... 379/88 |
| 5,920,542 A * | 7/1999 | Henderson .................. 370/217 |
| 5,923,016 A | 7/1999 | Fredregill et al. |
| 5,930,764 A | 7/1999 | Melchione et al. |
| 5,930,804 A | 7/1999 | Yu et al. |
| 5,933,142 A | 8/1999 | LaStrange et al. |
| 5,937,165 A | 8/1999 | Schwaller et al. |
| 5,938,729 A | 8/1999 | Cote et al. |
| 5,949,976 A | 9/1999 | Chappelle |
| 5,953,389 A | 9/1999 | Pruett et al. |
| 5,956,714 A | 9/1999 | Condon |
| 5,958,016 A | 9/1999 | Chang et al. |
| 5,960,411 A | 9/1999 | Hartman et al. |
| 5,961,602 A | 10/1999 | Thompson et al. |
| 5,963,925 A | 10/1999 | Kolling et al. |
| 5,966,695 A | 10/1999 | Melchione et al. |
| 5,970,467 A | 10/1999 | Alavi |
| 5,974,396 A | 10/1999 | Anderson et al. |
| 5,974,441 A | 10/1999 | Rogers et al. |
| 5,982,864 A | 11/1999 | Jagadish et al. |
| 5,982,891 A | 11/1999 | Ginter et al. |
| 5,983,350 A | 11/1999 | Minear et al. |
| 5,991,733 A | 11/1999 | Aleia et al. |
| 5,991,746 A | 11/1999 | Wang |
| 5,991,806 A | 11/1999 | McHann, Jr. |

| | | |
|---|---|---|
| 5,995,948 A | 11/1999 | Whitford et al. |
| 5,999,525 A | 12/1999 | Krishnaswamy et al. |
| 5,999,965 A | 12/1999 | Kelly |
| 5,999,972 A | 12/1999 | Gish |
| 5,999,973 A | 12/1999 | Glitho et al. |
| 6,003,079 A | 12/1999 | Friedrich et al. |
| 6,006,265 A | 12/1999 | Rangan et al. |
| 6,011,844 A | 1/2000 | Uppaluru et al. |
| 6,012,090 A | 1/2000 | Chung et al. |
| 6,014,647 A | 1/2000 | Nizzari et al. |
| 6,014,702 A | 1/2000 | King et al. |
| 6,018,768 A | 1/2000 | Ullman et al. |
| 6,021,409 A | 2/2000 | Burrows |
| 6,023,762 A | 2/2000 | Dean et al. |
| 6,029,182 A | 2/2000 | Nehab et al. |
| 6,031,904 A | 2/2000 | An et al. |
| 6,032,132 A | 2/2000 | Nelson |
| 6,032,184 A | 2/2000 | Cogger et al. |
| 6,041,325 A * | 3/2000 | Shah et al. .................... 707/10 |
| 6,041,357 A | 3/2000 | Kunzelman et al. |
| 6,044,144 A * | 3/2000 | Becker et al. .............. 379/265 |
| 6,044,362 A | 3/2000 | Neely |
| 6,049,602 A * | 4/2000 | Foladare et al. ............ 379/265 |
| 6,049,789 A | 4/2000 | Smorodinsky |
| 6,052,450 A | 4/2000 | Allison et al. |
| 6,058,170 A | 5/2000 | Jagadish et al. |
| 6,058,381 A | 5/2000 | Nelson et al. |
| 6,064,667 A | 5/2000 | Gisby et al. |
| 6,065,002 A | 5/2000 | Knotts et al. |
| 6,065,059 A | 5/2000 | Shieh et al. |
| 6,072,493 A | 6/2000 | Driskell et al. |
| 6,073,105 A * | 6/2000 | Sutcliffe et al. ............... 705/1 |
| 6,073,122 A | 6/2000 | Wool |
| 6,073,241 A | 6/2000 | Rosenberg et al. |
| 6,078,891 A | 6/2000 | Riordan et al. |
| 6,078,924 A | 6/2000 | Ainsbury et al. |
| 6,084,953 A | 7/2000 | Bardenheuer et al. |
| 6,085,171 A | 7/2000 | Leonard |
| 6,085,190 A | 7/2000 | Sakata |
| 6,088,451 A | 7/2000 | He et al. |
| 6,088,796 A | 7/2000 | Cianfrocca et al. |
| 6,091,808 A | 7/2000 | Wood et al. |
| 6,094,655 A | 7/2000 | Rogers et al. |
| 6,104,704 A | 8/2000 | Buhler et al. |
| 6,105,131 A | 8/2000 | Carroll |
| 6,108,700 A | 8/2000 | Maccobee et al. |
| 6,108,782 A | 8/2000 | Fletcher et al. |
| 6,112,238 A | 8/2000 | Boyd et al. |
| 6,112,242 A | 8/2000 | Jois et al. |
| 6,115,040 A | 9/2000 | Bladow et al. |
| 6,115,458 A | 9/2000 | Taskett |
| 6,115,693 A | 9/2000 | McDonough et al. |
| 6,115,737 A | 9/2000 | Ely et al. |
| 6,119,109 A | 9/2000 | Muratani et al. |
| 6,122,258 A | 9/2000 | Brown |
| 6,128,624 A | 10/2000 | Papierniak et al. |
| 6,130,933 A | 10/2000 | Miloslavsky |
| 6,131,095 A * | 10/2000 | Low et al. .................... 707/10 |
| 6,131,116 A | 10/2000 | Riggins et al. |
| 6,134,584 A | 10/2000 | Chang et al. |
| 6,137,869 A | 10/2000 | Voit et al. |
| 6,145,001 A * | 11/2000 | Scholl et al. ............... 709/223 |
| 6,154,744 A | 11/2000 | Kenner et al. |
| 6,161,102 A | 12/2000 | Yanagihara et al. |
| 6,161,126 A | 12/2000 | Wies et al. .................. 709/203 |
| 6,161,128 A | 12/2000 | Smyk |
| 6,173,311 B1 | 1/2001 | Hassett et al. |
| 6,205,456 B1 | 3/2001 | Nakao |
| 6,212,506 B1 | 4/2001 | Shah et al. |
| 6,212,558 B1 | 4/2001 | Antur et al. |
| 6,240,450 B1 | 5/2001 | Sharples et al. |
| 6,253,239 B1 | 6/2001 | Sharma |
| 6,275,490 B1 | 8/2001 | Mattaway et al. |
| 6,286,050 B1 | 9/2001 | Pullen et al. |
| 6,291,551 B1 | 9/2001 | Roberts et al. |
| 6,292,481 B1 | 9/2001 | Voit et al. |
| 6,337,858 B1 | 1/2002 | Petty et al. |
| 6,377,993 B1 | 4/2002 | Brandt et al. |
| 2001/0001014 A1 | 5/2001 | Akins, III et al. |

OTHER PUBLICATIONS

"Stac Unveils Windows NT 4.0 and Web Browser Support in New ReachOut 7" http://www.stac.com/news/pressrel/pr_ro7_unveil.html.

"Cryptography and the Internet", www.echonyc.com/~ysue/crypt.html, 1995.

Lee et al., "Supporting Multi-User, Multi-Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

Kenney, Kathleen, "American Management Systems Launces Internet-Based Customer Care and Billing Tool for Telecom Firms", PR Newswire, New York, Oct. 9, 1996, extracted from http://proquest.umi.com on internet Feb. 28, 2002.

Morgan, Rick, "When Used Right, Internet can be Effective Marketing Tool", Madison Capital Times, Madison, WI, Nov. 8, 1996, extracted from http://proquest.umi.com on internet on Feb. 28, 2002.

Edwards, Morris, "The Electronic Commerce Juggernaut", Communication News, Nokomis, Sep. 1997, vol. 34, Issue 9, extracted from http://proquest.umi.com on Internet on Feb. 28, 2002.

Quadri et al., Hewlett-Packard and Cisco Systems, "Internet Usage Platform" White Paper.

"HP and Cisco Deliver Internet Usage Platform and Billing and Analysis Solutions, New Platform and Solutions Allow ISPs and Carriers to Offer Value-added Services", Copyright 1998 Cisco Systems, Inc. http://www.cisco.com/warp/public/146/pressroom/1998/apr98/28.html.

HP Smart Internet, "Transform User Data Into Revenue", Copyright Hewlett-Packard Company, 1999.

HP Smart Internet Usage Analysis Solution, "Transform User Data Into Competitive Advantage", Copyright Hewlett-Packard Company, 1999.

HP/Cisco, Internet Usage Platform, "Transforming Internet Services Into Revenue" ©Hewlett-Packard Co. 1998.

"Release Note for Netflow FlowCollector Release 2.0," ©Jul. 1998 and "Release Notes for Netflow FlowAnalyzer Release 1.0" ©Sep. 1997.

HP Invent, "Capturing the Usage Billing Advantage", Copyright 1994–2001, Hewlett Packard http://www.hp.com/communications/usage/infolibrary/whitepapers/dsforum_print.html.

Anonymous, "Call Accounting Products", Teleconnect, vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro-Tel's Microcall for Windows 95/NT", Teleconnect, vol. 15, No. 12, p. 35, Dec. 1997.

Biggs, M., "Help for the Web enhances customer support, reduces help desk load" *Inforworld*, Jun. 16, 1997, v. 19, No. 24, pp. 82+.

Burch, B., "AT&T, MCI to release new management tools", *Network World*, Jan. 17, 1994, p. 19.

Low, C., "Integrating Communication Services", *IEEE Communication Magazine*, Jun. 1997, pp. 164–169.

"McAfee's New 'Self–Service' Help Desk Web Suite Makes PCs Help Desk–Ready", Newswire Association Inc., Oct. 13, 1997.

Niemeyer, R., "Using Web Technologies in Two MLS Environments: A Security Analysis." *IEEE*, pp. 205–214, 1997.

Porter, T., "MCI offers tracking system: Direct Dispatch lets users eye problems remotely", *Service News*, April 1994, p. 17.

Shklar, L., et al., "MetaMagic: Generating Virtual Web Sites Through Data Modeling," http://www.scope.gmd.de/info/www6/posters/714/poster714.html.

Vizard, M. et al., "MCI to Pilot Convergence Billing Service", *InfoWorld*, v. 18, Issue 37, Sep. 9, 1996.

Yager, T., "Mixed Messages", *UNIX Review*, v. 16, n. 2, p. 29, Feb. 1998.

"Carriers Improve Net Management Services", *Communications Week*, May 2, 1994, p. 74.

"Network management; new software platform enhances network management capabilities; MCI ServiceView offers greater cost savings, increased flexibility.", Product Announcement, *Edge*, Oct. 2, 1995, on & about AT&T, v. 10, n. 375, p. 11(1).

"New software platform enhances network management capabilities . . . ", *Business Wire*, Sep. 28, 1995 p. 9281122.

"User's Guide: Microsoft Access", Microsoft Corporation, 1994, pp. 378,594,599, 630–632 (13).

Jainschigg, J., "Billing confirmed: this easy–to–use box turns guest calls into revenue." *Teleconnect*, vol. 12, No. 9, p. 39(4).

Chapman, D. Brent et al., "Building Internet Firewalls", Nov. 1995, O'Reilly & Associates, p. 58.

Meteorology; Databases, "Inforonics offers controlled access to Web Meteorology", Information Today, Apr. 97, vol. 14 Issue 4, p53, 2p. This article reports that Inforonics has developed a controlled access gateway to MGA (Meteorological and Geoastrophysica).

Rosen,Michele, BPCS steps into new millennium, Midrange Systems; Spring House; May 10, 1996. This article informs about the new release of BPCS Client/Server Software as the most extensive upgrade of the product since 1980s. It incorporates onject tech.

Inoue et al., "Secure Mobile IP Using Security Primitives", IEEE 1997.

He, Taniguchi, Internet Trafic Control and Management Architecture, IEEE, p s46–03–1–s46–03–5.*

Sixth Intrnational Conference on Network Protocols, IEEE, Table of Contenets.*

Markovich, WAN Service Level Management Could Keep Your Feet out of the fire, NetworkWorld, 1996–1998.*

* cited by examiner

| Order Select List | | | | | | | |
|---|---|---|---|---|---|---|---|
| NG Order No. | NC Order No. | Eff. Date | Last Modified | Type | Sub Type | Status | Parent | Child |
| 0000000000000016 | F0104658 | 98/06/09 13:35 | 98/06/09 13:34 | IMPL | | Complete | | |
| 0000000000000022 | F0105643 | 98/05/11 20:30 | 98/06/11 09:30 | FETS | | Complete | | |
| 0000000000000026 | F0105655 | 98/06/09 20:36 | 98/06/11 09:36 | NBRS | | Complete | | |
| 0000000000000033 | F0106118 | 98/06/06 17:32 | 98/06/12 17:31 | IMPL | | Complete | | |
| 0000000000000037 | F0105920 | 98/06/08 17:00 | 98/06/15 16:38 | FEAT | QUIK | Marketing Approval | | |
| 0000000000000002 | F0101402 | 98/06/05 09:08 | 98/05/22 09:07 | FEAT | | Complete | | |
| 0000000000000006 | F0102435 | 98/07/09 09:51 | 98/06/09 13:33 | IMPL | | Complete | | |
| 0000000000000013 | F0104381 | 98/06/09 11:58 | 98/06/08 12:01 | IMPL | | Complete | | |
| 0000000000000017 | F0104781 | 98/10/09 18:28 | 98/06/09 18:29 | FEAT | | Complete | | |
| 0000000000000021 | F0105642 | 98/06/09 20:27 | 98/06/11 09:27 | FETS | | Complete | | |

422 — [Administration] [Order Detail] [Report] [Cancel] [Help]

Displaying query results. Please select an order from the list.

FIG. 14

INTEGRATED PROXY INTERFACE FOR WEB BASED TELECOMMUNICATION TOLL-FREE NETWORK MANAGEMENT USING A NETWORK MANAGER FOR DOWNLOADING A CALL ROUTING TREE TO CLIENT

CROSS-REFERENCE TO RELATED APPLICATIONS

The following patent application is based on and claims the benefit of U.S. Provisional Patent Application Ser. No. 60/060,655, filed Sep. 26, 1997.

FIELD OF THE INVENTION

The present invention relates generally to information delivery systems and, particularly, to a novel, WWW/Internet-based, telecommunications network management service for customers of a telecommunications service provider.

BACKGROUND OF THE INVENTION

Telecommunications service entities, e.g., MCI, AT&T, Sprint, and the like, presently provide for the presentation and dissemination of customer account and network data management information to their customers predominantly by enabling customers (clients) to directly dial-up, e.g., via a modem, to the entity's application servers to access their account information, or, alternately, via dedicated communication lines, e.g., ISDN, T-1, etc., enabling account information requests to be initiated through their computer workstation running, for example, a Windows-based graphical user interface. The requests are processed by the entity's application server's, which retrieves the requested customer information from one or more databases, processes and formats the information for downloading to the client's personal computer, or more primitively, a 3270 dumb terminal or a low-end workstation.

Telecommunications service providers that offer 800/8xx toll-free network service to their customers currently provide some type of user interaction to manage their 800/8xx network call routing plans. These plans may be pre-arranged and activated either by customer initiation, i.e., dial-up with a user access code and identification number, or, activated automatically at some prearranged time according to a prearranged schedule. For example, a customer may have a routing plan designed for "normal" conditions and other plans for special conditions, e.g., weekend, holiday, promotions, etc. which may be automatically activated. Additional enhanced toll-free number management features are currently available to customers. For instance, customers can add, change or delete their enhanced routing trees or routing plans in near-real time for their toll-free numbers, for example, to respond to traffic conditions, emergencies etc.

The assignee of the present invention, MCI, currently provides an MCI ServiceView ("MSV") product line that provides its business customers with Windows-based client-server applications including an 800-Network Manager ("800NM") which is a PC-Windows based GUI to MCI's Network Control System ("NCS"). Particularly, NCS is used to perform enhanced routing on MCI's network for special service calls. The legacy order entry system for NCS is referred to as Network Capabilities System ("NetCap"). Orders for a customer's routing features for that customer's 800/8xx traffic are entered into NetCap which processes the order (edits, validates, logs) and submits orders to a Service Control Manager ("SCM") which then formats and distributes orders to each of three redundant data access points ("DAPS") which implements the plan orders at the network switches. Once an order is implemented on the DAPS, calls to the customer's 800/8xx number are processed with the features specified in the order.

Particularly, NetCap is a mainframe MVS system that implements an on-line subsystem for accepting orders for toll-free and VNET routing plans. It also has a background-processing subsystem that takes these orders, processes them, stores them in a database, and feeds orders to SCM. Currently, there are three methods for accessing NetCap: a direct 3270 terminal connection for internal MCI users which provides access to 100 percent of NetCap's functions; a PC-based 3270 terminal emulation program that utilizes 56 kbps dial-up access to a majority of NetCap functions; and, a PC-based Windows application entitled "800NM", written in C++, for example, which enables customers to implement and configure routing plans for toll free and virtual networks (VNET) via the existing MCI Service View (MSV) infrastructure comprising a private network of routers and protocol converters that connect PC Windows applications to NetCap.

Additionally supported by MCI is an 800 Configuration Manager which is an 3270 mainframe based product having the following capabilities:

1) Managing Logical Termination ("Lterm") orders by providing capability to add, change, or delete Dialed Number Identification Service ("DNIS") and Enhanced DNIS values. These service features affect the termination of a Toll Free call by allowing customers to terminate two or more 8xx numbers to a single service group to receive pulsed digits and identify the specific 8xx number dialed. The 800 CM functions allow users to add, change, or delete DNIS digits for a termination already using DNIS.

2) Providing Network Call Redirect ("NCR") functionality allowing customers to define, activate, and display NCR tables comprising instructions for calls needing termination overflow.

3) Displaying of toll-free network trigger points and active/inactive status.

4) Enabling the management of supplemental codes, e.g., ID Codes and Accounting Codes, that are additional numbers entered after a Toll Free number is dialed.

5) Providing Call blocking service at the following levels: Geographic, 8xx, Enterprise, Corp Id, and ANI (8xx, SAC, Freephone).

6) Providing Enhanced Voice Services ("EVS") including automated voice response, voice processing, and call routing functionality. The call processing behind EVS is Enhanced Call Routing (ECR) which is supported by 800 CM to control routing plans on the MRS/ECR platform. The current ECR environment uses 'hidden' 800 numbers to build and control the routing after it leaves the platform.

7) Providing Intelligent Call Routing ("ICR") features through MCI's NetCap order entry system which allows customers to control the routing of their incoming Toll Free traffic on a call by call basis. Using rules defined by the customer, changes in Toll Free traffic routing are performed in real time based on changes in status at customer terminations. Particularly, NetCap flags the Corporate ID as an ICR account; creates and maintains trigger points; and creates and maintains destination labels.

Thus, for a special service number (i.e., 800/8xx number), NetCap functions enable a customer to define up to 100 routing plans, only one of which is active at any time. Multiple routing plans are used by NetCap's alternate routing feature: a customer can change routing plans on-the-fly with a NetCap "IMPL" order. A plan can specify routing rules (where to route a call) that are based on point of call origination, day of week, time of day, percent allocation of traffic, and other features. Features are specified with a NetCap "FEAT" order. A customer can also submit a NetCap "QUIK" order to temporarily change the percent allocation of traffic for a number. This is used, for example, in the case of a disaster at a certain destination. NetCap may also be used to configure terminations; configuration includes specification of outpulsed digits, whether termination is domestic or international (determines signaling), whether termination is a Dedicated Access Line or a shared Feature Group (determines signaling), and overflow routing.

Currently, the IMPL, FEAT, and QUIK orders are provided by the MSV 800NM platform.

While the current 800NM and tollfree network management features in the current MSV platform are sufficient for those with existing access, a need exists to provide a newer, faster platform with new toll free network management capabilities for customers through the public Internet.

Moreover, a need exists to integrate the existing tollfree network management client-server application in a Web-based platform which provides expedient comprehensive and more secure data access and reporting services to customers from any Web browser on any computer workstation anywhere in the world.

SUMMARY OF THE INVENTION

The present invention is directed to a novel toll-free network management tool for a Web-based (Internet and Intranet) client-server application that enables customers to define their own 800/8xx toll free number routing plans via the Web/Internet. The toll-free network management tool enables customers to change and modify their existing 800/8xx toll free number routing plans, e.g., specifying routing rules for directing 800/8xx toll free calls along different routes and terminations based on pre-determined criteria, or, temporarily change the percent allocation of traffic for a particular 800/8xx toll free number based on certain criteria. The client server application is a Web-based, object-oriented application that implements a Remote Method Invocation-like protocol providing customers with toll-free network management features including: stacking order capability, e.g., to temporarily change the routing of toll free traffic; enabling enhanced order queries; enabling the automatic notification of order completion or rejection; and providing enhanced inventory reporting.

According to the principles of the invention there is provided a toll-free network management tool that enables customers of telecommunications network providers to modify the configuration of their toll-free networks via a Web/Internet-based graphical user interface. The tool provides customers Web/Internet access to toll-free call routing plans and associated routing plan details via a secure Web/Internet-based connection, and additionally provides a customer with the ability to specify implementation of a specific call routing plan for a toll-free number at a predetermined time, and the ability to re-configure an existing call routing plan. Additionally, the tool enables a roll-back of a particular call-routing plan or call plan detail to a prior configuration at a user-specified time.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIG. 14 illustrates an exemplar screen display showing the results of an order query;

DETAILED DESCRIPTION OF THE INVENTION

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, the nMCI Interact system architecture is basically organized as a set of common components comprising the following:

1) an object-oriented software architecture detailing the client and server based aspect of nMCI Interact;

2) a network architecture defining the physical network needed to satisfy the security and data volume requirements of the networkMCI System;

3) a data architecture detailing the application, back-end or legacy data sources available for networkMCI Interact; and 4) an infrastructure covering security, order entry, fulfillment, billing, self-monitoring, metrics and support.

Each of these common component areas will be generally discussed hereinbelow. A detailed descriptions of each of these components can be found in a related, co-pending U.S. patent application Ser. No. 09/159,695, entitled INTEGRATED CUSTOMER INTERFACE SYSTEM FOR COMMUNICATIONS NETWORK MANAGEMENT, the disclosure of which is incorporated herein by reference thereto.

Figure 1:
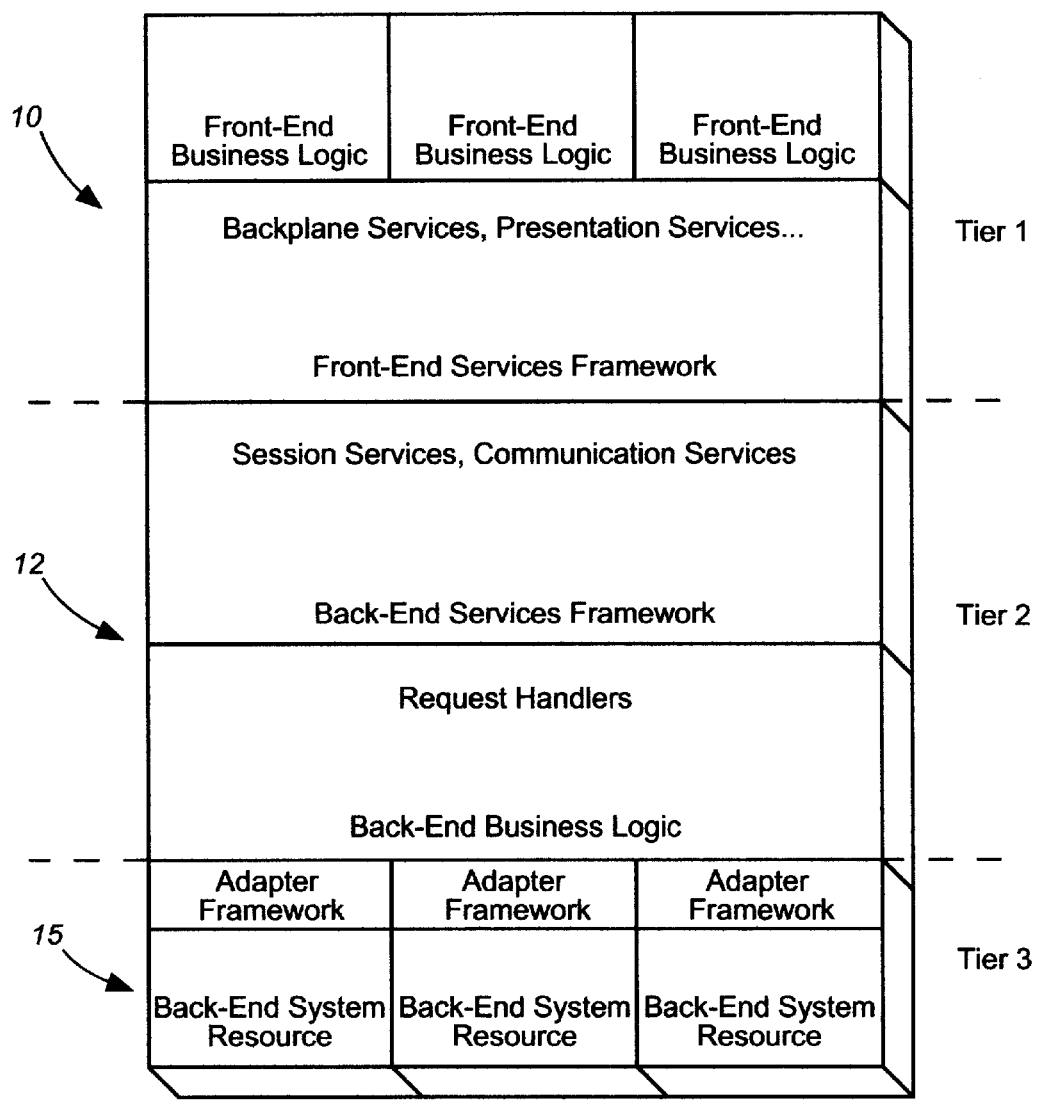
FIG. 1 illustrates the software architecture component comprising a three-tiered structure.

FIG. 1 is a diagrammatic illustration of the software architecture component in which the present invention functions. A first or client tier 10 of software services are resident on a customer work station 10 and provides customer access to the enterprise system, having one or more downloadable application objects directed to front end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additionally applications are directed to front end services such as the presentation of data in the form of tables and charts, and data processing functions such as sorting and summarizing in a manner such that multiple programs are combined in a unified application suite.

A second or middle tier 12, is provided having secure web servers and back end services to provide applications that establish user sessions, govern user authentication and their entitlements, and communicate with adaptor programs to simplify the interchange of data across the network.

A third or back end tier 15 having applications directed to legacy back end services including database storage and retrieval systems and one or more database servers for accessing system resources from one or more legacy hosts.

Generally, as explained in U.S. Pat. No. 6,115,040, entitled GRAPHICAL USER INTERFACE FOR WEB ENABLED APPLICATIONS, the contents and disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or Call Manager functions. The system is capable of delivering to customers the functionality appropriate to their product mix.

Figure 2:
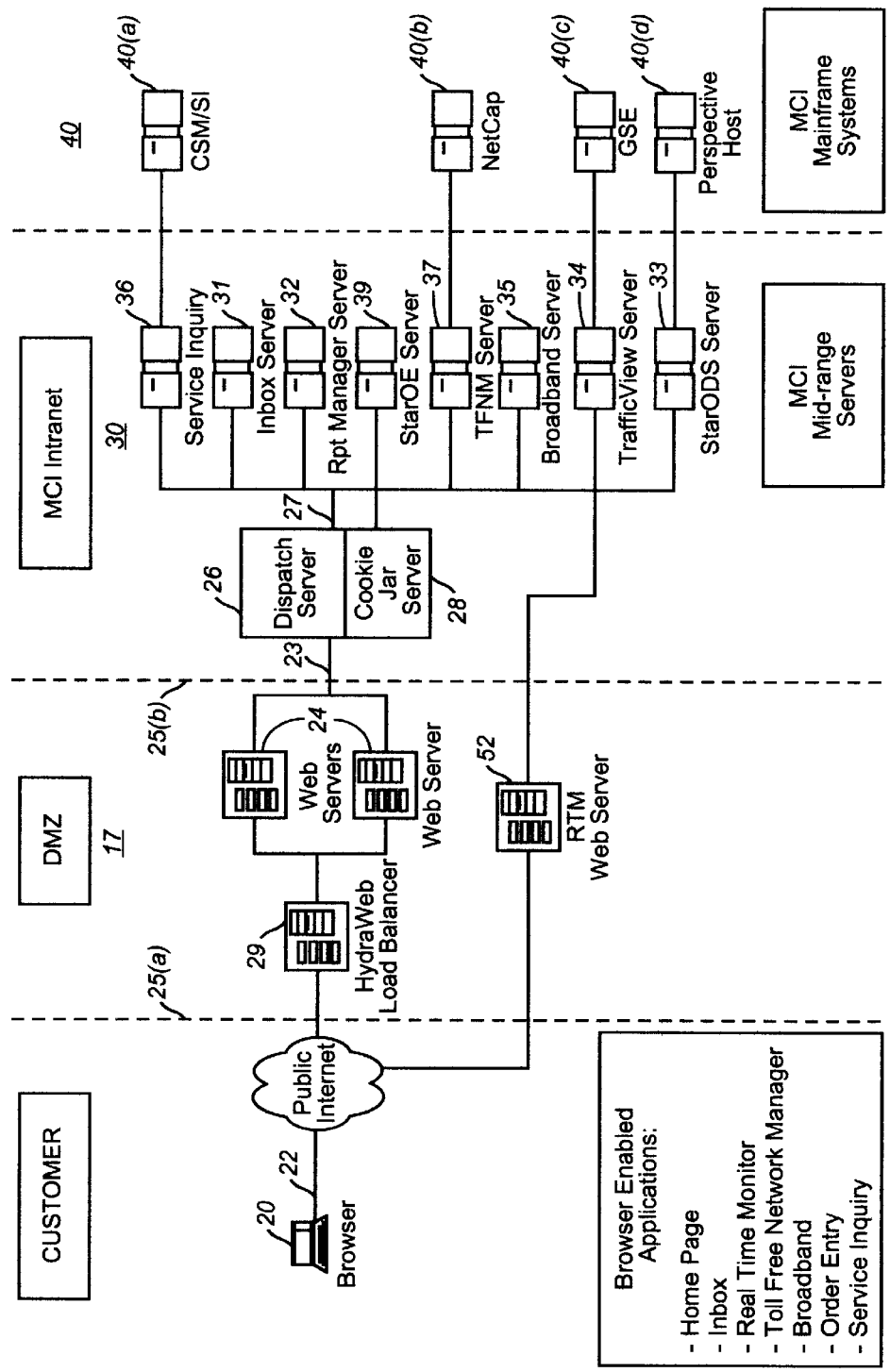
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
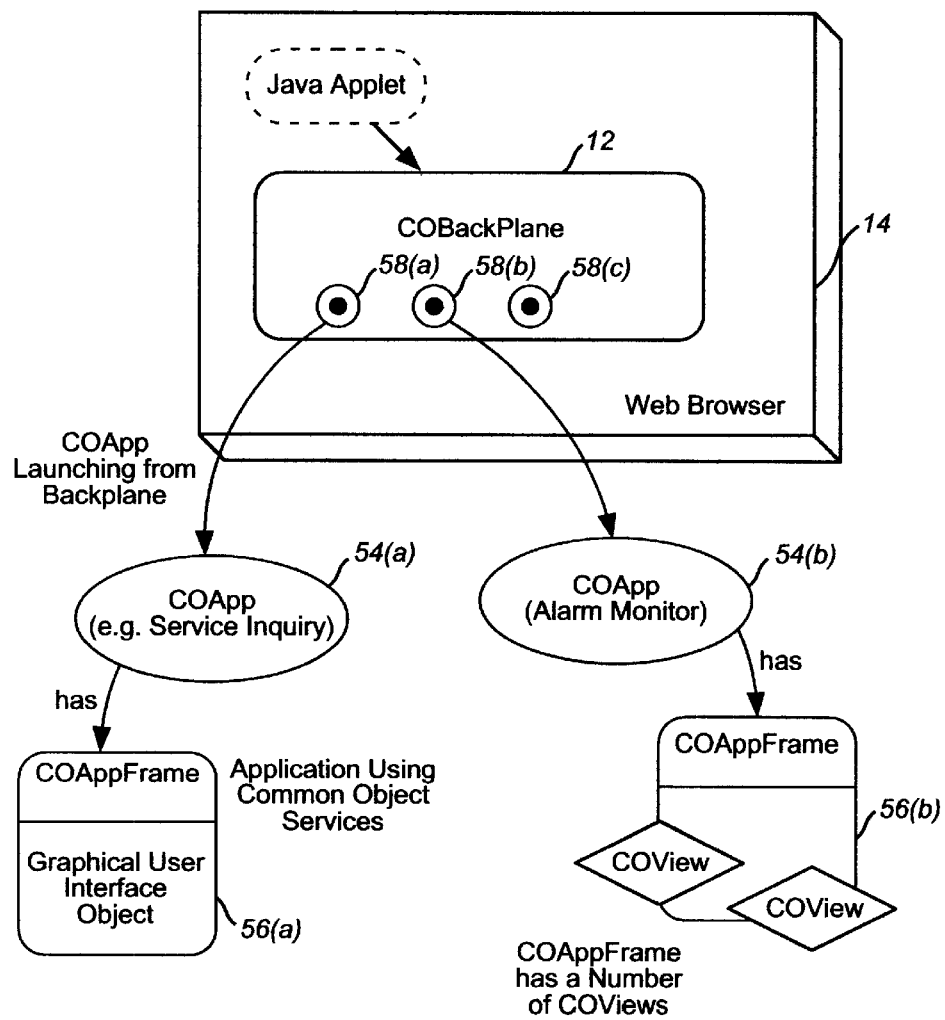
FIG. 3 is an illustrative example of a backplane architecture schematic.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described in the above-mentioned, co-pending U.S. Pat. No. 6,115,040, entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects which provide the front end business logic and manages their launch. The network-MCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which can be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58a,b,c selectable by the user. As illustrated in FIG. 3, upon selection of an application, the backplane 12 launches that specific application, for example, Service Inquiry 54a or Alarm Monitor 54b, by creating the application object. In processing its functions, each application in turn, may utilize common object services provided by the backplane 12. FIG. 3 shows graphical user interface objects 56a,b created and used by a respective application 54a,b for its own presentation purposes.

Figure 4:
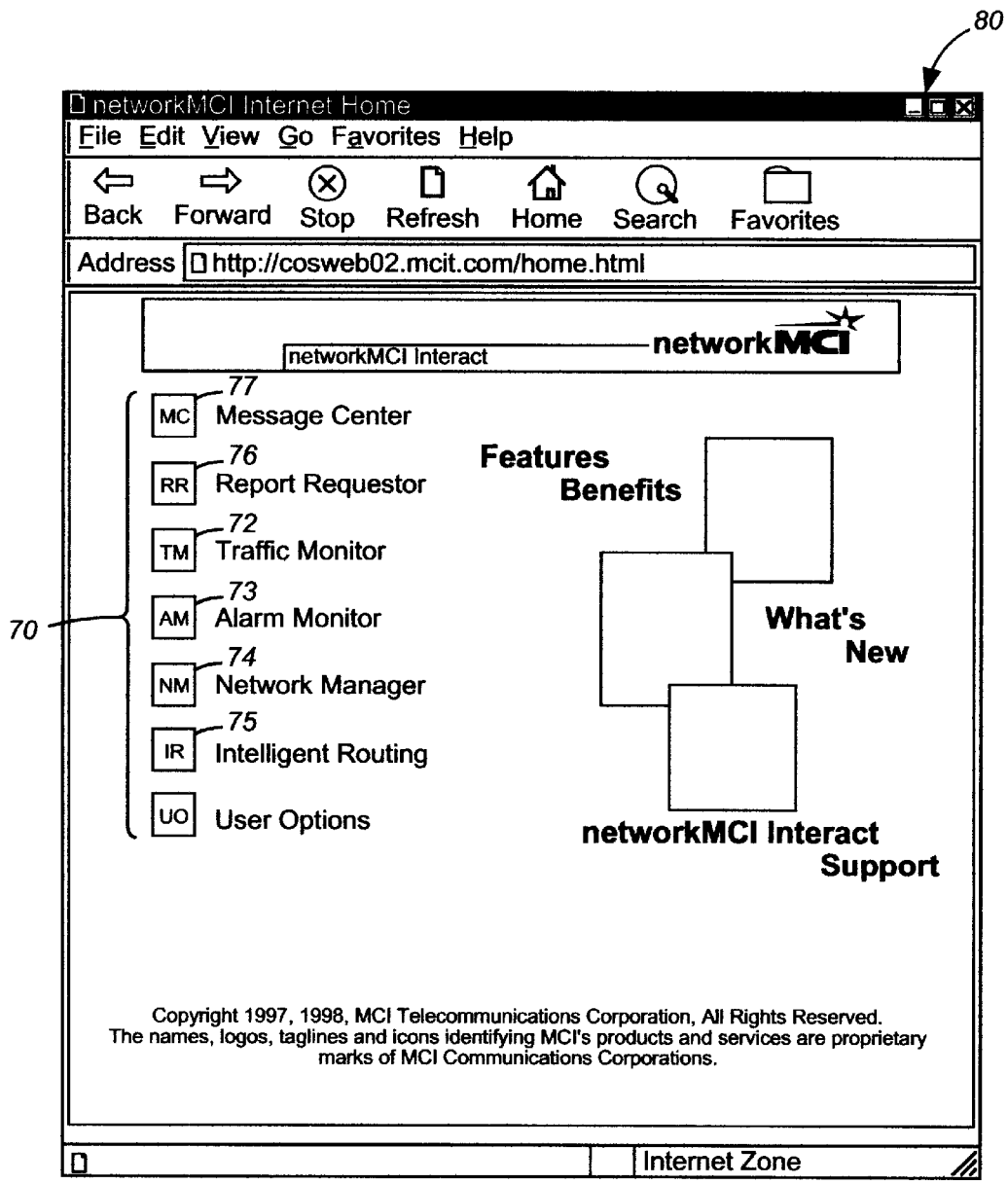
FIG. 4 illustrates an example client GUI presented to the client/customer as a browser web page.

FIG. 4 illustrates an example client GUI presented to the client/customer as a browser web page 80 providing, for example, a suite 70 of network management reporting applications including: MCI Traffic Monitor 72; an alarm monitor 73; a Network Manager 74 and Intelligent Routing 75. Access to network functionality is also provided through Report Requester 76, which provides a variety of detailed reports for the client/customer and a Message Center 77 for providing enhancements and functionality to traditional e-mail communications.

As shown in FIGS. 3 and 4, the browser resident GUI of the present invention implements a single object, COBackPlane which keeps track of all the client applications, and which has capabilities to start, stop, and provide references to any one of the client applications.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54*a*, 54*b*, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp() method. The launched application then may use the backplane for inter-application communications, including retrieving Inbox data.

The COBackPlane 12 includes methods for providing a reference to a particular COApp, for interoperation. For example, the COBackPlane class provides a getApp() method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, co-pending patent application GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 will re-encrypt the request using symmetric encryption and forward it over a second socket connection 23 to the dispatch server 26 inside the enterprise Intranet.

As described in greater detail in commonly owned, co-pending U.S. patent application Ser. No. 09/159,514, now allowed, entitled SECURE CUSTOMER INTERFACE FOR WEB-BASED DATA MANAGEMENT, the contents and disclosure of which is incorporated by reference as if fully set forth herein, a networkMCI Interact session is designated by a logon, successful authentication, followed by use of server resources, and logoff. However, the worldwide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jarserver 28, as illustrated in FIG. 2 has been found desirable to minimize the load on the dispatch server 26. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25*b* over a TCP/IP connection 23 to the dispatch server 26 on a new TCP socket while the original socket 22 from the browser is blocking, waiting for a response. The dispatch server 26 will unwrap an outer protocol layer of the message from the DMZ services cluster 24, and will reencrypt the message with symmetric encryption and forward the message to an appropriate application proxy via a third TCP/IP socket 27. While waiting for the proxy response all three of the sockets 22, 23, 27 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from StarOE server 49 at logon time and cached.

If the requestor is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages, a Report Manager Proxy capable of communicating with a system-specific Report Manager server 32 for generating, managing and scheduling the transmission of customized reports including, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. In the present invention the Services Inquiry server 36 includes communication with MCI's Customer Service Management legacy platform 40(*a*). Such network management and customer network data is additionally accessible by authorized MCI management personnel. As shown in FIG. 2, other legacy platforms 40(*b*), 40(*c*) and 40(*d*) may also communicate individually with the Intranet servers for servicing specific transactions initiated at the client browser. The illustrated legacy platforms 40(*a*)–(*d*) are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
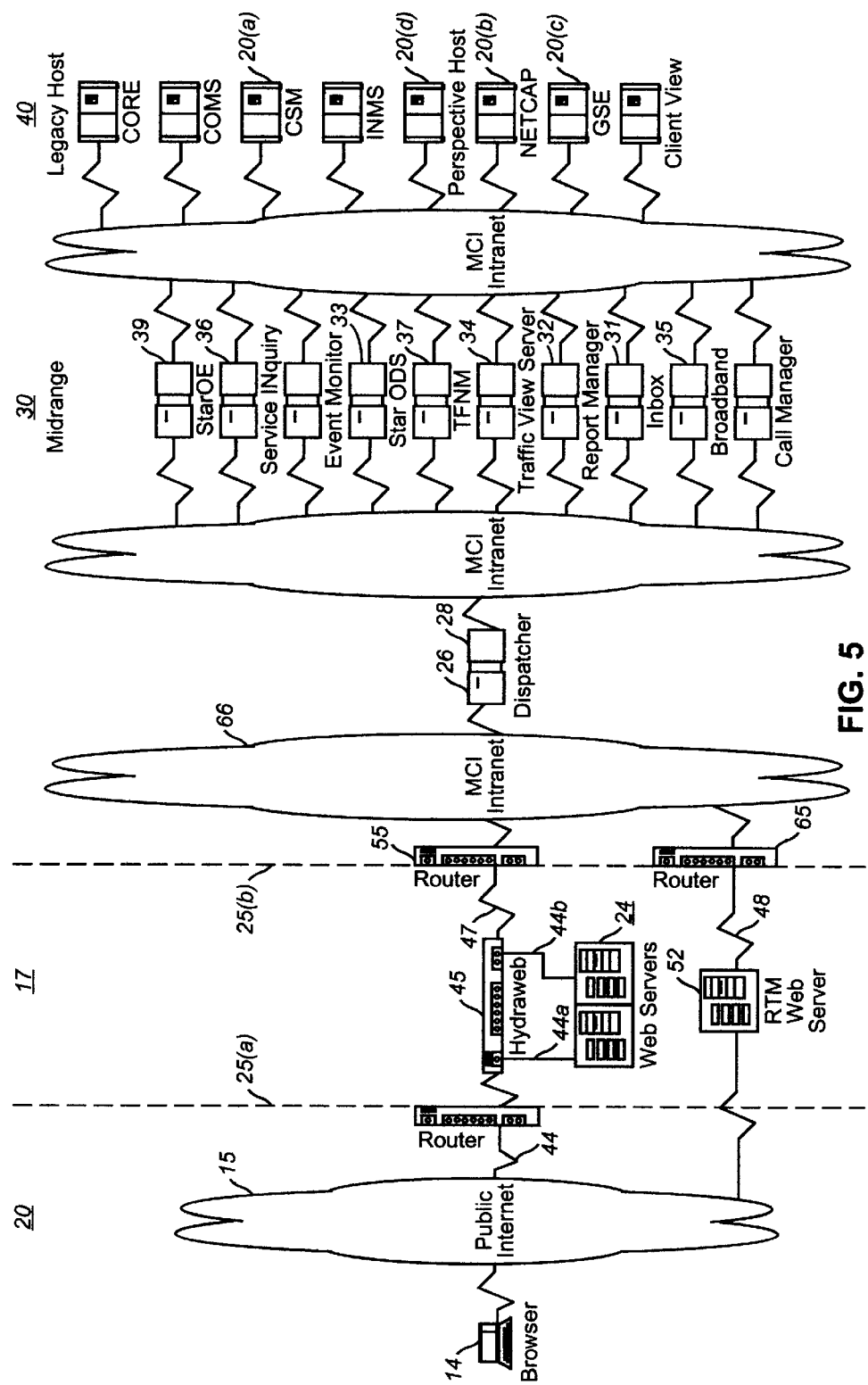
FIG. 5 is a diagram depicting the physical networkMCI Interact system architecture.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back end business logic applications.

As illustrated in FIG. 5, the present invention includes a double or complex firewall system that creates a "demilitarized zone" (DMZ) between two firewalls 25*a*, 25*b*. In the preferred embodiment, one of the firewalls 29 includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 29*a* in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The Hydraweb unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEB™ 45 over a connection 44a and generates the appropriate encrypted messages for routing the request to the appropriate MCI Intranet midrange web server over connection 44b, router 55 and connection 23. Via the Hydraweb unit 45, a TCP/IP connection 38 links the Secure Web server 24 with the MCI Intranet Dispatcher server 26.

Further as shown in the DMZ 17 is a second RTM server 52 having its own connection to the public Internet via a TCP/IP connection 48. As described in co-pending U.S. patent application Ser. No. 09/159,516, entitled INTEGRATED PROXY INTERFACE FOR WEB BASED TELECOMMUNICATIONS MANAGEMENT TOOLS, incorporated by reference as if fully set forth herein, this RTM server provides real-time session management for subscribers of the networkMCI Interact Real Time Monitoring system. An additional TCP/IP connection 48 links the RTM Web server 52 with the MCI Intranet Dispatcher server 26.

With more particularity, as further shown in FIG. 5, the networkMCI Interact physical architecture includes three routers: a first router 49 for routing encrypted messages from the Public Internet 15 to the HydraWeb 45 over a socket connection 44; a second router 55 for routing encrypted subscriber messages from a Secure Web server 24 to the Dispatcher server 26 located inside the second firewall 25b; and, a third router 65 for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

As described herein, and in greater detail in co-pending U.S. patent application Ser. No. (PCT/US98/20173), the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

All reporting is provided through a Report Requestor GUI application interface which support spreadsheet, a variety of graph and chart type, or both simultaneously. For example, the spreadsheet presentation allows for sorting by any arbitrary set of columns. The report viewer may also be launched from the inbox when a report is selected. A common database may be maintained to hold the common configuration data which can be used by the GUI applications and by the mid-range servers. Such common data will include but not be limited to: customer security profiles, billing hierarchies for each customer, general reference data (states, NPA's, Country codes), and customer specific pick lists: e.g., ANI's, calling cards, etc.. An MCI Internet StarOE server will manage the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data will be resident in an Inbox server database and managed by the Inbox server.

The Infrastructure component of the nMCI Reporting system includes means for providing secure communications regardless of the data content being communicated. As described in detail in above-referenced, co-pending U.S. patent application Ser. No. 09/159,514, now allowed, the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source in the actual identified sender. One technique employed to combat repudiation includes use of an audit trail with electronically signed one-way message digests included with each transaction.

Another component of the nMCI Interact infrastructure includes order entry, which is supported by the Order Entry ("StarOE") server. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; 14) Portfolio; and, 15) Client View.

The Self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of means to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. Pat. No. 6,115,040, the client-tier software is organized into a "component" architecture supporting such applications as inbox fetch and inbox management, report viewer and report requester, TFNM, Event Monitor, Broadband, Real-Time Monitor, and system administration applications. Further functionality integrated into the software architecture includes applications such as Outbound Network Manager, Call Manager, Service Inquiry and Client View.

The present invention focuses on the client and middle-tier service that enables customers to request, specify, and receive and view data pertaining to their toll free network management assets, e.g., toll free number routing plans, and to generate orders for changing aspects of the routing plans via a World Wide Web interface.

Figure 6:
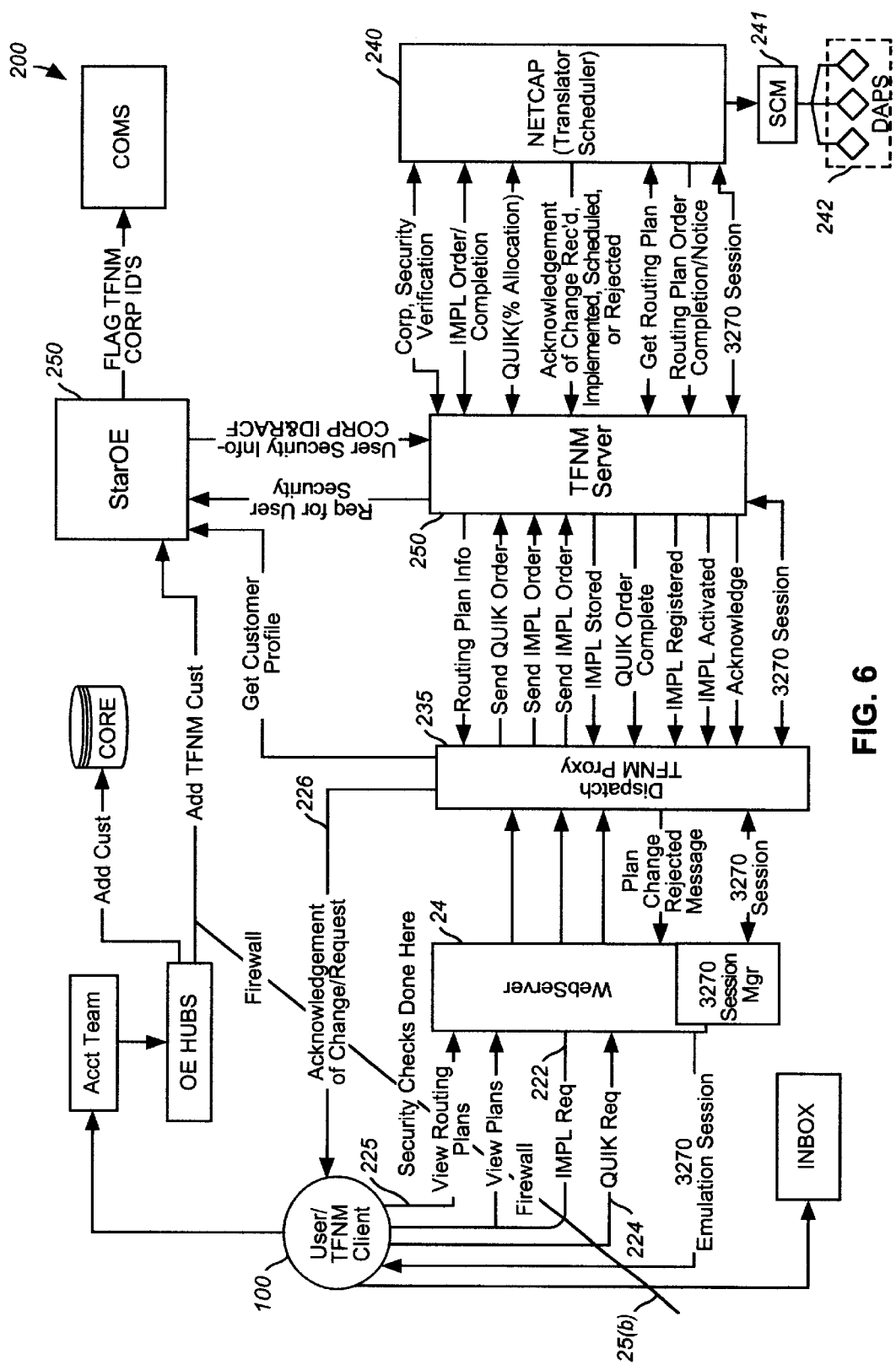
FIG. 6 is a general block diagram depicting the physical architecture of the TFNM system components.

As shown in FIG. 6, the toll free network management tool 200 of the invention, referred to herein as "TFNM," implements a TFNM domain server 250 which is one component part of a back-end MCI intranet infrastructure comprising above-described MCI's NetCap order entry system 240, Service Control Manager 241 ("SCM") and Data Access Points 242 ("DAP"). As will be described in greater detail, the TFNM tool 200 of the invention enables customers to change their toll-free network management plans, both in real-time and on a scheduled basis, via nMCI Interact's web-based front-end and middle-tier infrastructure. Particularly, customer directives are entered by the user 100 via a TFNM graphic user interface. These directives are preferably communicated as Java applets over secure TCP/IP socket connections for input over the firewall 25(b) to at least one secure server, e.g., a DMZ Web server that provides for authentication, validation, and session management in the manner as described in co-pending U.S. patent application Ser. No. 09/159,514, now allowed, the contents and disclosure of which is incorporated by reference as if fully set forth herein. As will be described, the TFNM server 250 interfaces with the "NetCap" 240 mainframe system that provides user interface to the network control system, i.e., DAP switches 242 (FIG. 6). The TFNM domain server 250 includes Java object classes whose methods are invoked by Java applets running on the customer browser. The browser Java applets specifically execute the customer directives by invoking certain methods on the TFNM Domain server 250. These Java objects additionally provide the interface functions to the NetCap 240. In the preferred embodiment, the Java objects at the TFNM domain server function as a proxy, and are invoked remotely implementing a Java remote method invocation "RMI"-like methodology.

Particularly, as mentioned herein with respect to FIG. 2, within the networkMCI Interact framework for producing Java applications over the Internet, there is provided common objects and an infrastructure allowing secure communications between a client (which resides on a browser) and a server (which resides safely within MCI's firewalls). As described, the security strategy includes: encrypting communication from the client to the web-server via SSL (HTTPS) and implementing HTTPS as the preferred method for allowing communication into the web server from the Internet; providing an additional firewall between the web-server and the dispatcher to allow only specific traffic from the web server to the dispatcher to occur; encrypting traffic between the web server and the dispatcher via DSA encryption; and enabling the dispatcher to validate all packets destined to internal MCI servers to ensure that they are from an authenticated client, and that a particular client has permission to communicate with a specific back-end server. To make this seamless for the client, a set of Common Objects performs this messaging, such as described in U.S. Pat. No. 6,115,040. In the preferred embodiment, the invention implements a modified RMI which is referred to as "CORMI" (Common Objects RMI) which provides an RMI-like interface between the client and the server using the networkMCI Interact protocol. The CORMI procedures implemented have additional controls built in to provide the necessary session security and maintenance for communication over the firewalls.

More specifically, CORMI is MCI Interact's protocol for providing secure, client-to-server communication with Java RMI-like semantics and comprises a library of Java classes used by both the client applet and server application. In view of FIG. 6, the communication path from the client and the server is as follows:

The TFNM server application 250 registers remote objects with CORMI's CORemoteSessionServer (analogous to Java RMI's Registry service) and then blocks waiting for connections. The TFNM client applet initiates communication by performing a logon through a COClientSession object. The COClientSession creates a COSynchTransaction (an atomic unit of work based over an HTTPS socket) which connects to the MCI Interact system dispatcher server 235 (which is behind the outer firewall 25(b)). The dispatcher server 235 process validates the client's authorization to logon (a process that involves contacting the StarOE service and generating a session key with a 'cookiejar' process). After validating the client, the dispatcher uses a round-robin protocol to select a TFNM server and then opens an HTTPS connection to an instance of the TFNM server application. On this server, the CORemoteSessionServer creates a new session for this client and records the session key.

A reply to a logon is sent back through the dispatcher to the client 100. The client then can do a lookup which results in a serialized remote interface of the remote object registered earlier being passed back to the client. The client can then use this remote interface as it would with Java RMI-doing remote method invocations. The remote method invocations are handled by CORMI as COSynchTransactions through the dispatcher to the same TFNM server instance that the logon and interface lookup took place at.

It should be understood that there is no permanent connection between the TFNM client and server; CORMI, through a COSynchTransaction, creates a new HTTPS connection to the dispatcher (and the dispatcher creates a connection to the TFNM server) for each unit of communication.

Figure 7:
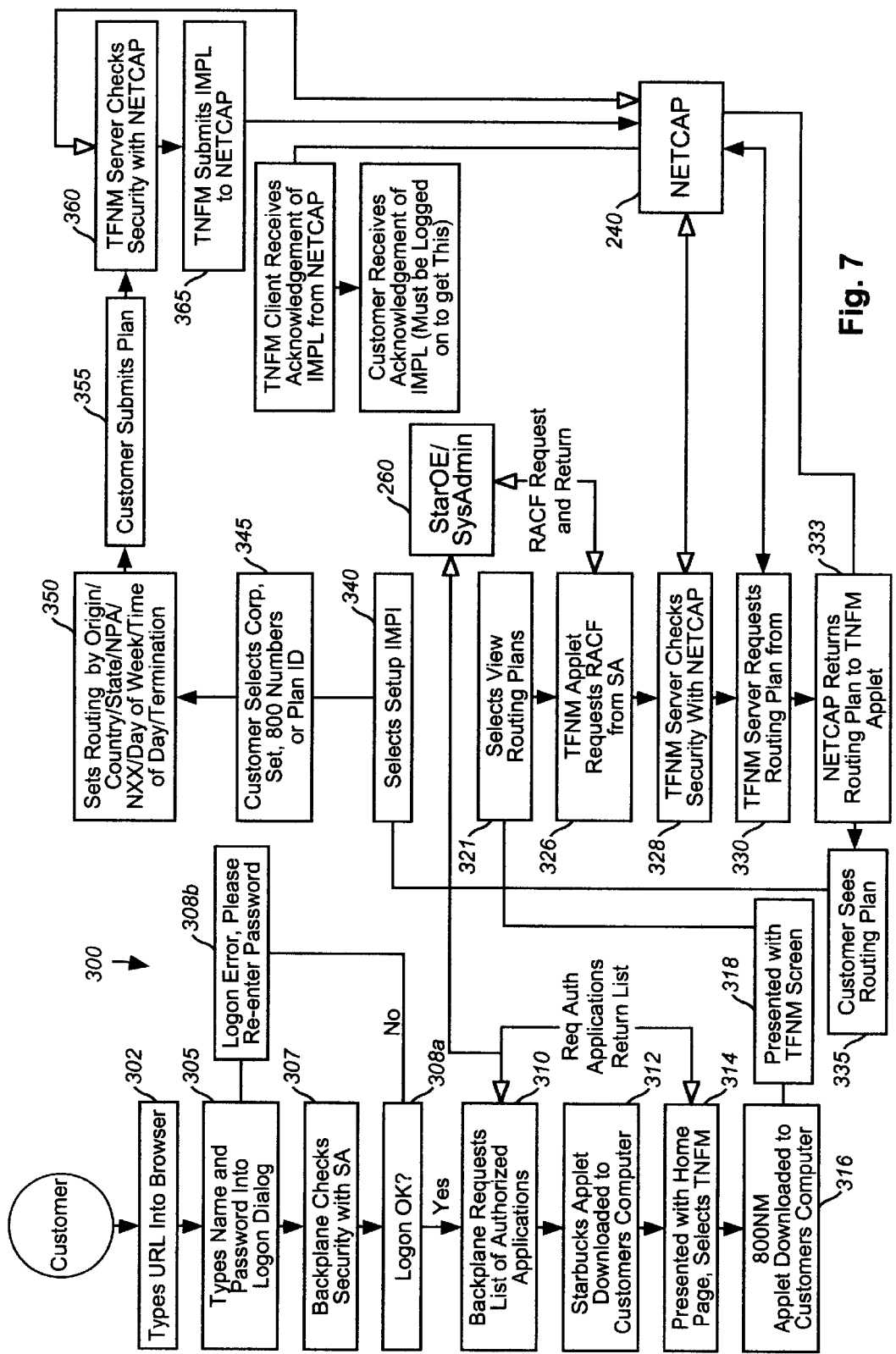
FIG. 7 is a flow diagram depicting the web-based, toll free network manager of the invention.
Figure 8:
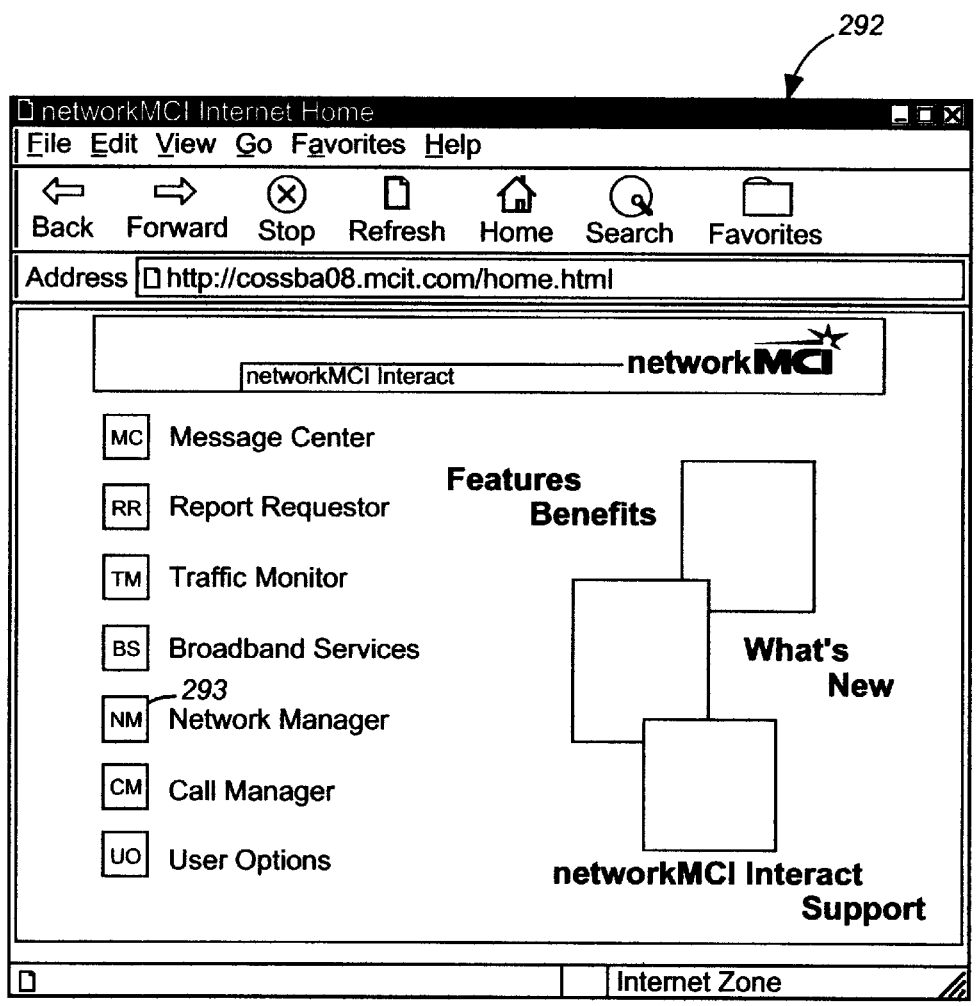
FIG. 8 illustrates an exemplar nMCI Interact systems home page.

As shown in the process flow diagram of FIG. 7, a customer first types in the URL into the Web Browser where a connection is made to the networkMCI Interact web page, as indicated at step 302. Having accessed the web page, the user logs in, as indicated at step 305, and a user Common Object is created. At this point, a message is sent via an established HTTPS connection via a Dispatcher Server 235 (FIG. 6) to the StarOE Server 260 to validate the customer as indicated at step 307. Once the customer is validated, at step 308a, b, the backplane objects request a list of all the authorized applications from the StarOE server, as indicated at step 310. At steps 312 and 314 respectively, a networkMCI Interact applet is downloaded to the customers Web Browser via the established HTTPS connection, and the browser presents the customer with the networkMCI Interact systems home page, such as the exemplary home page 292 shown in FIG. 8. It should be understood that in the preferred embodiment, the icons for applications the user has security access to are shown bolded. Referring back to FIG. 7, at step 314, the customer selects the TFNM application from the home page by clicking on a Network Manager icon 293 (FIG. 8) after StarOE validates the user's id and password in the manner as described in commonly owned, co-pending U.S. patent application Ser. No. 09/159, 408, entitled AUTHENTICATION AND ENTITLEMENTS FOR USERS OF WEB BASED DATA MANAGEMENT PROGRAMS, the contents and disclosure of which is incorporated by reference as if fully set forth herein. The backplane object allows the user access to the TFNM front end if the user is so authorized. As shown at step 316, a client TFNM application is downloaded to the customer who is presented with the TFNM screen, as indicated at step 318.

Figure 9A:
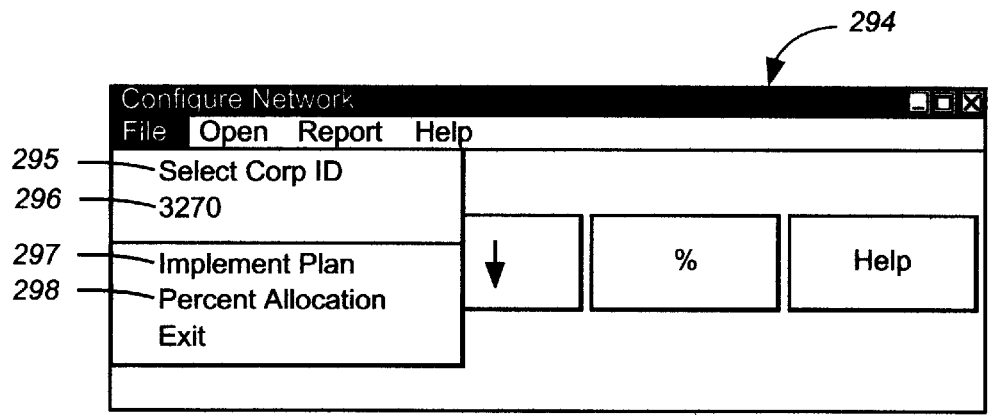
FIGS. 9(a)–9(c) illustrate an exemplary TFNM screen providing functionality through option menus.
Figure 9B:
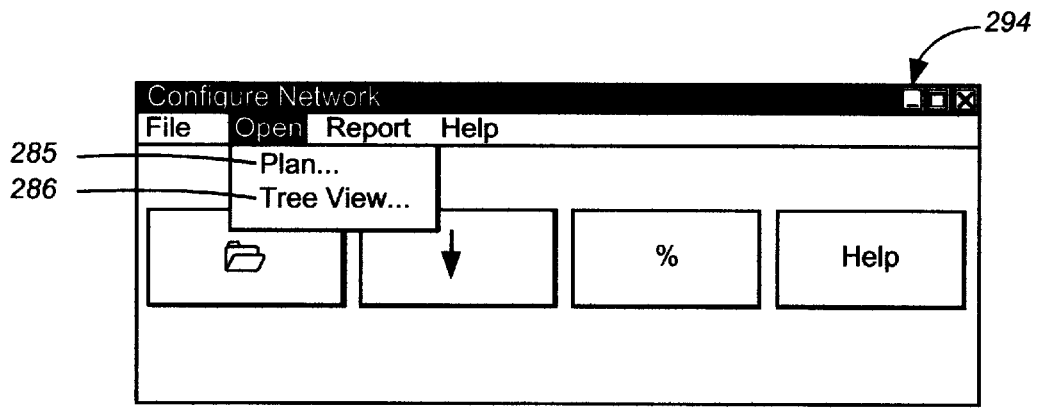
Figure 9C:
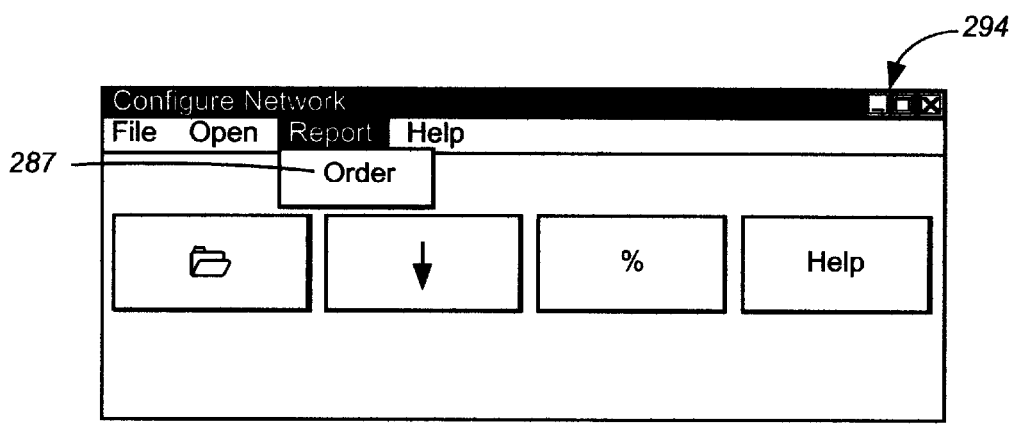

An exemplary TFNM web-page display 294 is shown in FIG. 9(a) which presents a variety of TFNM file menu options including: 1) an option 295 enabling a user to select a Corp ID, i.e., a corp, set, number, and plan to establish a working environment; 2) an option 296 enabling a user to cut-through to a 3270 mainframe NetCap application; 3) an option 297 enabling a user to Implement Plan, i.e., put a plan in use by creating an IMPL order; and, 4) an option 298 enabling a user to modify the termination of a routing plan by creating a QUIK order. As further shown in FIG. 9(*b*), the open menu includes a Plan option 285 which allows the user to select from a list of plans in the current working environment and enables opening of the plan in a graphical mode on a VORT ("View Only Routing Tree"), as will be explained; and a Tree View option 286 which displays the last plan accessed on the VORT screen. As further shown in FIG. 9(*c*), the report menu includes an option 287 for allowing the user to set up and execute an order filter query which results in the display of an order list, as will be hereinafter described in greater detail. Thus, referring back to FIG. 7, at step 321, the customer is enabled to select a view of his/her routing plans in accordance with that user's privileges. To determine privileges, as indicated at step 326, TFNM user security profile information is requested from StarOE that comprises a list of Corp Ids and AccessId combinations, referred to herein as "RACF ID" combinations that the customer is allowed to access within TFNM. Particularly, user security profile elements obtained from StarOE include: Corp Id, i.e., the Corporation Id the customer user has access to within StarOE; and DefaultInd, i.e., a default CorpId indicator having, for example, 'Y' or 'N' values.

Once the customer has logged into TFNM and has received the StarOE security message, a communication is made from the TFNM server 250 to NetCap 240, as indicated at step 328, requesting a user security profile. Particularly, the messaging system implemented for all communications between the TFNM server and NetCap is referred to herein as "Registry", such as shown and described in commonly-owned, co-pending U.S. Pat. No. 5,790,809, the contents and disclosure of which are incorporated by reference as if fully set forth herein. Security from NetCap is by Racf Id and Corp Id. For each Corp Id a user has access to, that user must have a Racf Id. If a user has Enterprise level security, then the list of Corps under that Enterprise within NetCap have the same security as the Enterprise. Particularly, in response to a user login, in the preferred embodiment, a TFNM server application is executed. From this application, the TFNM server instantiates a Profile Manager Java object which is registered with CORMI and called upon to invoke further objects relating to the following: user profile, e.g., preferences, user security profiles, i.e., for tracking customer entitlements/privileges including rights for creating or modifying specific TFNM routing plans or generating QUIK or IMPL orders; and, session management, i.e., objects which encapsulate the state and behavior associated with a specific user login, e.g., time logged in.

In the preferred embodiment, once profile manager is instantiated at step 328, the TFNM server additionally instantiates objects related to view screens and options according to the user's entitlements/privileges. Specifically, a Corporation Manager ("CorpMngr") object is invoked to enable the user to select the corporation having the desired routing plan to be looked at. Then, the following objects are sequentially invoked: a Set Manager object for the corporation selected; a Number Manager object that knows the TFNM numbers (e.g., 1-800/8xx) belonging to the Set and/or Corp; and, a Plan Manager object, which knows the routing plans that belong to the selected corporation, set, and/or number selected by the user up to that point. It should be understood that the TFNM server is enabled to communicate with NetCap server for this data if not provided in the TFNM database, or, if the information in TFNM is not current. For instance, for some messages, a data sync may always be invoked. Thus, TFNM may contact NetCap and pass date and time stamps indicating the last update for the record. If NetCap determines that they have later data version, it will pass down the updated version, otherwise, it will pass an empty message back to TFNM. Alternately, an internal table 245, as shown in FIG. 6, may be accessed indicating the intervals for data record updates and which will indicate the last time a data sync was performed for a particular record. By checking this table, a determination may be made as to whether contact must be made to NetCap for a data update.

In the preferred embodiment, as shown in FIG. 6, the TFNM server 250 communicates a plan/data sync message 243 via Registry messaging to NetCap. Appendix A illustrates the Registry message call "NPSNC" which is the request to sync a plan and transmitted from the TFNM server to NetCap. A variety of Registry response messages for this request is provided in Appendix B.

Figure 10:
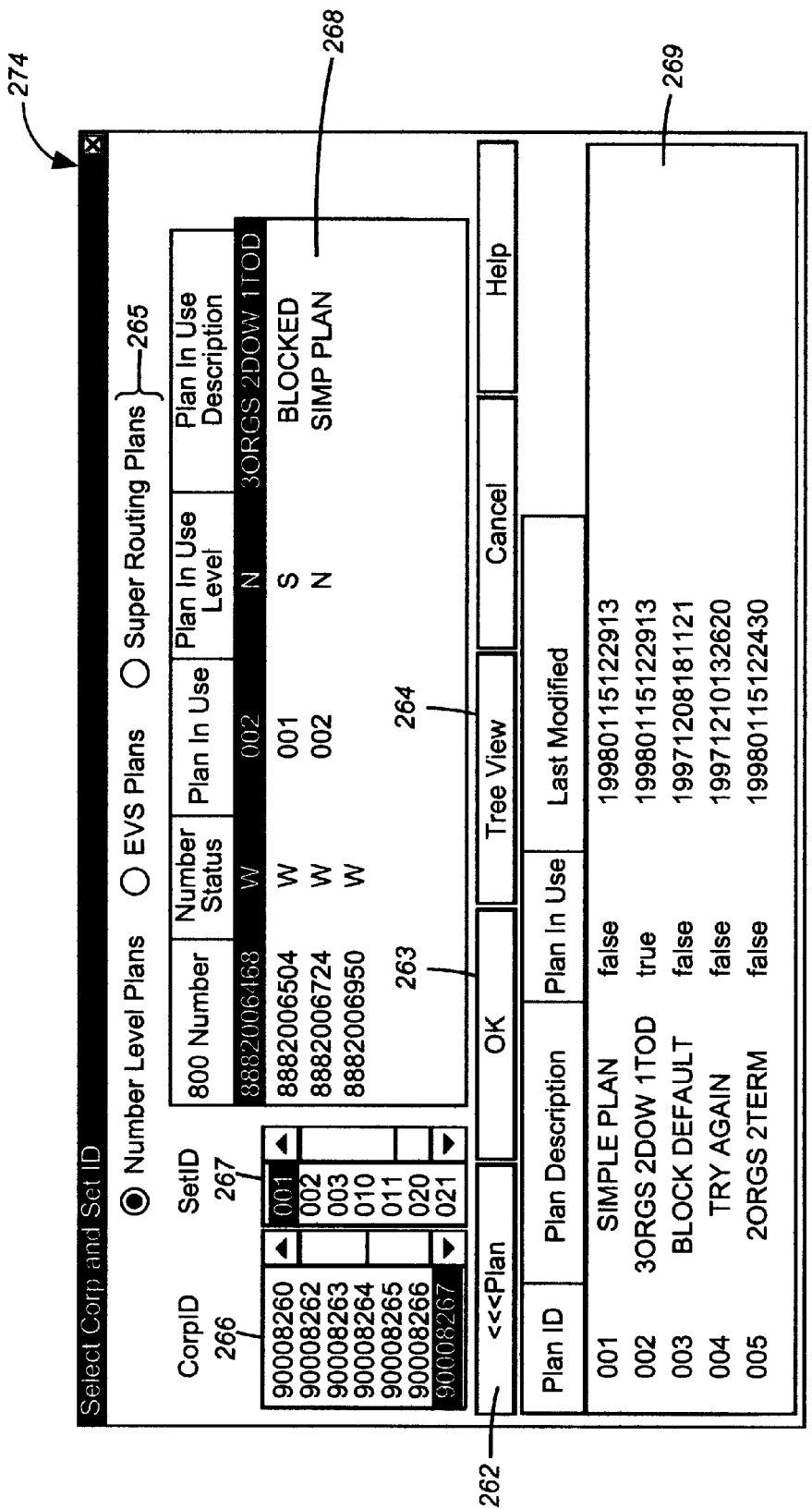
FIG. 10 illustrates an example display when the File/Select Corp ID menu option of FIG. 8 is selected.

As shown in FIG. 10, the File/Select Corp ID menu option causes a screen to be displayed that enables the user to select elements (Corp ID, Set ID, Routing Number) that invoke objects for establishing a working environment, or, to select a plan for view. The data elements displayed on this screen differ according to the type of plan chosen. In the preferred embodiment, the TFNM Network Manager 200 enables the customer to create or modify orders for four types of TFNM routing plans: a Number Level Plan ("NLP"), Super Routing Plans ("SRP"), Enhanced Voice Service Routing plans ("EVS"), and universal routing plans ("URP"). As shown in FIG. 10, Number Level, EVS, or Super Routing plan radio buttons 265 may be selected to access corresponding visible screen elements. When an NLP plan is selected, for instance, the following elements are displayed: a Corp ID element 266 which is a single selection list box that becomes populated with corp id's available to the user in accordance with that user's entitlements; a Set ID element 267 which is a single selection list box populated with Set ID's that the user has security access to for a chosen Corp ID; a Number list box element 268 which is a single selection list box populated with number information for the indicated corp./set; and, a Plan list box 269 which is a single selection list box populated with plan information such as: a plan description, plan in use, or when the plan was last modified, for the selected number. It should be understood that corporate security is obtained from NetCap whenever a new Corp ID is selected, in the manner described.

In the preferred embodiment, using additional buttons 262, 263 and 264 from the screen shown in FIG. 10, the user respectively, is enabled to open or close the "plan" portion of the screen; save the selected corp/set/number/plan id as the user's current working environment; and/or display a tree view of the highlighted plan.

When the user chooses to view a selected routing plan, and after verifying security with both StarOE and NetCap, the TFNM server may execute the synch process with NetCap 240, as indicated at step 330, FIG. 7 and described above. During this process, TFNM updates any records in the TFNM server copy of the customer's chosen routing plan with changes that were made in NetCap since the user last accessed the system. The TFNM server database is updated with the latest routing plan information for that customer, and the updated routing plan information is sent to the user, as indicated at step 333. The customer is now presented with the requested routing plan view at step 335 via the TFNM client application, as shown in FIG. 6.

Figure 11:
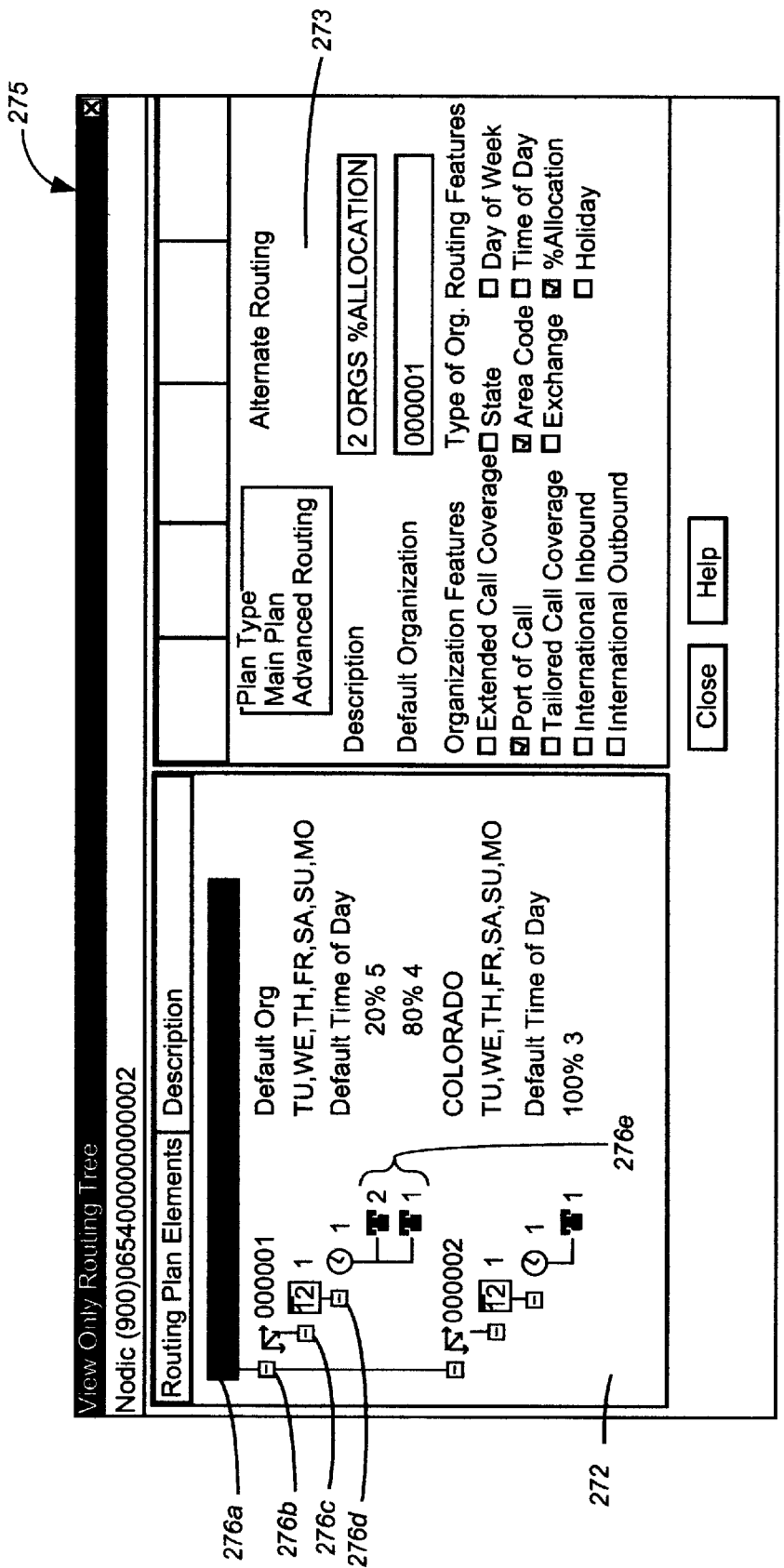
FIG. 11 illustrates an exemplar screen display depicting a hierarchical tree view of an example toll-free number routing plan.

A user may view a routing plan in several formats, e.g., a hierarchical tree graphic or a spreadsheet. In the preferred embodiment, as shown in the exemplar screen display of FIG. 11, the Routing Plan is displayed as a tree structure comprising of a series of linked node types in a specific hierarchy. As shown in FIG. 11, the screen is divided into two main sections: a first section 272 comprising the graphical representation of the routing tree having nodes tree branches that can be expanded and collapsed; and, a second section 273 for displaying the details of the currently highlighted tree node. The node types that are available include: 1) a Plan node 276*a* which is shown highlighted in FIG. 11 and details the features for the plan; 2) an Origination node ("ORIG") 276*b* which details the geographical elements used in determining where to route the call. Multiple Origination nodes may exist under a plan node; 3) a Day of Week node ("DOW") 276*c* which details how to route calls based on days of the week. Multiple Day of Week nodes may exist under an Origination and all seven days of the week must be accounted for under each origination; 4) a Time of Day node ("TOD") 276*d* which details specific time ranges for routing calls. Multiple Time of Day nodes may exist under a Day of Week and all 24 hours of the day must be accounted for under each Day of Week; and, 5) a Percent Logical Termination node ("%LTERM") 276*e* which details where the calls terminate and at what percentage of the time. As shown in FIG. 11, multiple %LTERM nodes may exist under a Time of Day. The percentages in "sibling" nodes must add up to 100 percent. A user can select details of any node by clicking or scrolling. Trigger Points (not shown) may also be displayed as children of the node they ride on. For example, a Trigger Point that rides on an Origination node would be displayed under the Origination on the same level as a Day-of-Week node. At each node, decisions related to the call routing are executed.

As shown in FIG. 11, for a plan node, the corresponding plan detail screen 273 is populated with the existing plan description; the Orig id of the default orig on the plan; and Origination Features having values derived based on the features in use on the plan. Likewise, for an origination node 276*b*, the corresponding plan detail screen displays: the ID of the highlighted origination node and the corresponding description including listboxes displaying the geographic elements (countries, states, area codes and exchanges) associated with the highlighted Origination node. For the DOW node 276*c*, the corresponding plan detail screen displays the Day Id of the DOW node and the list of days associated with the DOW node. For the TOD node 276*d*, the corresponding plan detail screen displays the list of time ranges associated with the TOD node. For the Termination node 276*e*, the corresponding plan detail screen displays: the ID of the termination associated with the highlighted node; a description of the termination associated with the highlighted node; an indication of whether a cross corp term is associated with the highlighted node, and, if the Cross Corp Term indicator is "Yes," a field displaying the cross corp Id associated with the termination in the Termination ID field; and an indication of the percentage of calls allocated to this termination node. Further details may be displayed including a Details tab (not shown) for displaying: the customer service id associated with the termination; the activation date of the termination; the activation date received associated with the termination; the service status associated with the termination; the Switch Trunk ID associated with the termination; and, an indication of whether the termination is EVS; whether the Termination has a real-time ANI Delivery and, the activation date for the Real Time ANI. Additionally, an ANI tab (not shown) may be displayed for presenting the user with information as to whether the termination has an Automatic Number Identifier ("ANI"), the country code associated with the termination and the Termination ANI. An "Overflow" tab of the termination details screen displays for the user: a network call redirect indicator indicating whether the termination has an NCR; a direct termination overflow indicator indicating whether the termination has a DTO. Likewise, a "DNIS" tab (not shown) may be displayed for presenting the user with information as to whether DNIS/Enhanced DNIS is active on the termination; the date that DNIS is activated; an indication of whether the Dialed Digit Outpulsing (DDO) is active on the termination; the prefix digits used for DNIS, and the number of digits to be reused for DNIS. Finally, an "International Outbound" tab (not shown) may be displayed for presenting the user with information as to whether international outbound is active on the termination; the Country code associated with the termination if international outbound is active; the Carrier code associated with the termination if international outbound is active; and the free phone number associated with the termination if international outbound is active.

Via the TFNM Client Application, the user is now able to invoke TFNM functions such as the "IMPL"depicted in FIG. 6 as the IMPL request 222 which enables the user to quickly change the number routing plan that a working number or set of working numbers is routing to; or "QUIK" depicted in FIG. 6 as the QUIK request 224 which enables the user to quickly add, change and/or delete one or more termination locations, and/or change the percentage allocation of two or more of these locations, for a currently implemented routing plan. In accordance with the present invention, additional directives may include: a temporary ("TEMP") IMPL directive which is created in conjunction with an Impl by entering a roll-back date so that the routing plan will revert to its prior use status prior to creation of the Impl; and a TEMP QUIK directive which enables roll-back of the changes made by a QUIK order to what they were before the QUIK.

Referring back to FIG. 7, for the case when a user desires to implement the IMPL/TEMP IMPL plan, or the QUIK/ TEMP QUIK, the user selects the Setup IMPL from the TFNM screen at step 340. Specifically, the TFNM Client application causes the instantiation of an "Order Manager" object which invokes methods capable of accessing all the information pertaining to orders for a given corp id, set, TFNM telephone number and plan. An order comprises two components: 1) an order administration record comprising data such as: order status, effective data time and order number, etc.; and, 2) order administration detail record which includes the detailed information pertaining to that order, e.g., changes to percent allocation or effective dates/ times etc. for a plan, etc. The Order Manager object includes an ImplOrder sub-class which knows about IMPL orders, e.g., IMPL functionality, and invokes objects to obtain order records, pertaining to plans. As mentioned, an IMPL order allows a user to change which routing plan they want to be "in use" for a specific number or a set of numbers.

Figure 12:
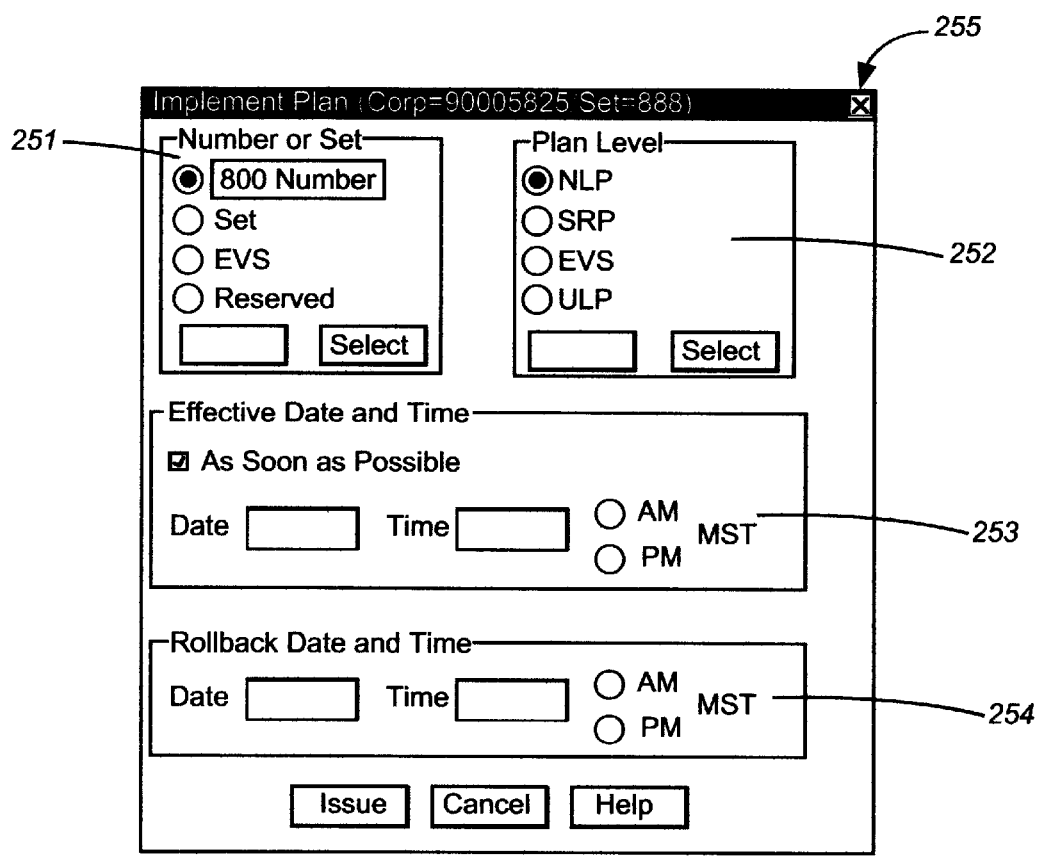
FIG. 12 illustrates an example IMPL dialog screen enabling the user to generate a TEMP IMPL/IMPL order for a desired Corp Id.

FIG. 12 illustrates the IMPL dialog screen 255 enabling the user to generate a TEMP IMPL/IMPL order for the desired Corp Id. Particularly, as shown in FIG. 12, a number/ set selection dialog box 251 is displayed having radio buttons enabling selection of the desired 800/8xx Number, a set of numbers, a reserved number; or, an EVS Number for implementing an EVS plan. Selection of one of these will invoke a "data controller" object for retrieving information from a TFNM database causing a corresponding dialog to appear enabling user search for the desired 800/8xx Number, set, reserved number, or EVS Number for the desired Corp Id. After selecting the desired number or set, the user is prompted to select from dialog box 252 the specific plan type that is to be IMPL'd for the number or set. As shown, the dialog box 252 comprises radio buttons enabling user selection of the desired plan IDs including, but not limited to, a Number Level Plan ("NLP") implemented for an 800/8xx Number or a set of numbers, a Super Routing Plan (SRP) implemented for an 800/8xx Number, a set of numbers, or a reserved number; and, an EVS plan implemented for an EVS Number. User selection of the plan is illustrated at step 345, FIG. 7. It should be understood that if the user has privileges for only one Corp ID, the system will select only the plans associated with that Corp ID for the user. If the user has privileges for more than one Corp ID, the user is presented with a list of all Corp IDs and will select one Corp ID. Any subsequent actions the user takes within the application are applicable to that selected corporation.

After having selected the Corp, set, Routing Plan Number or Routing Plan ID, the user may set or modify the routing as indicated at step 350. In the preferred embodiment, the user can define the routing plan according to any of the above-described options: Origin, Country, State, NPA, NXX, Day of week, Time of day, and Termination, as indicated at step 360. These options can be defined for each Corp ID, Set or number. In the preferred embodiment, the user is enabled to implement NLPs, SRPs, and EVSs and URPs for a selected toll free number or, implement NLPs and SRPs for a set of numbers that they want routed differently. Via IMPL request messaging, the user selects the desired routing plan for the number/set and the desired date and time when they want to start routing the number to the selected plan and forwards the request to the TFNM server via HTTPS messaging as indicated at step 355 (FIG. 7).

As shown in FIG. 6, the customer's Send IMPL request 222 is communicated over the HTTPS connection as a request to invoke methods in the Order Manager class/sub-classes via CORMI. Once the plan has been submitted to the TFNM server via the send IMPL message 222, the TFNM server receives the new routing plan and verifies the user's security with NetCap, as indicated at step 360 (FIG. 7). Once the user's security has been verified, the TFNM server submits the IMPL request to NetCap 240 via Registry messaging, as indicated at step 365. Particularly, the Order Manager classes/sub-classes execute methods for translating the IMPL order in a form suitable for submission to NetCap.

Appendix A illustrates the Registry message calls that are transmitted from the TFNM server to NetCap for the IMPL/ TEMP IMPL order and the corresponding NetCap responses. Included is the message for submitting an IMPL order (NIMPL) to NetCap.

It should be understood that, in the case of a user implementing a TEMP IMPL request, the user follows the same procedure as for the IMPL order, e.g., selecting the desired routing plan for the number/set and Corp Id. However, as shown in FIG. 12, the user is presented with a dialog 253 for submitting the desired date and time when the user wants to start routing the number to the selected plan, and, a dialog 254 for submitting the roll back date and time when they want the previous routing plan to be effective again. Thus, in accordance with the sequence of FIG. 7, both an IMPL and TEMP IMPL message pair is sent to the TFNM server for processing as described herein.

After a TEMP IMPL and/or IMPL request has been transmitted to NetCap 240, it is stored for future implementation. In view of FIG. 6, NetCap sends an acknowledgment via Registry messaging back to the TFNM server.

Appendix B illustrates the Registry message calls that are transmitted to the TFNM server from NetCap in response to the submitted IMPL order. Included is the message indicating successful processing of the IMPL request (NSUCS) and the message indicating completion of the order in NetCap (UCOMP). The TFNM server passes this information on to the user via CORMI messaging over the HTTPS connection. If the user is still logged on, this acknowledgment appears as a pop-up message on their screen, as indicated via line 226 in FIG. 6. If the user has logged off, TFNM retains the acknowledgment that the IMPL has been received and saved for the next user logon. Likewise, when an IMPL has been transmitted to NetCap and either implemented or terminated, NetCap sends a registry message back to the TFNM server which, in turn, passes this information back to the user via HTTPS connectivity.

Figure 13:
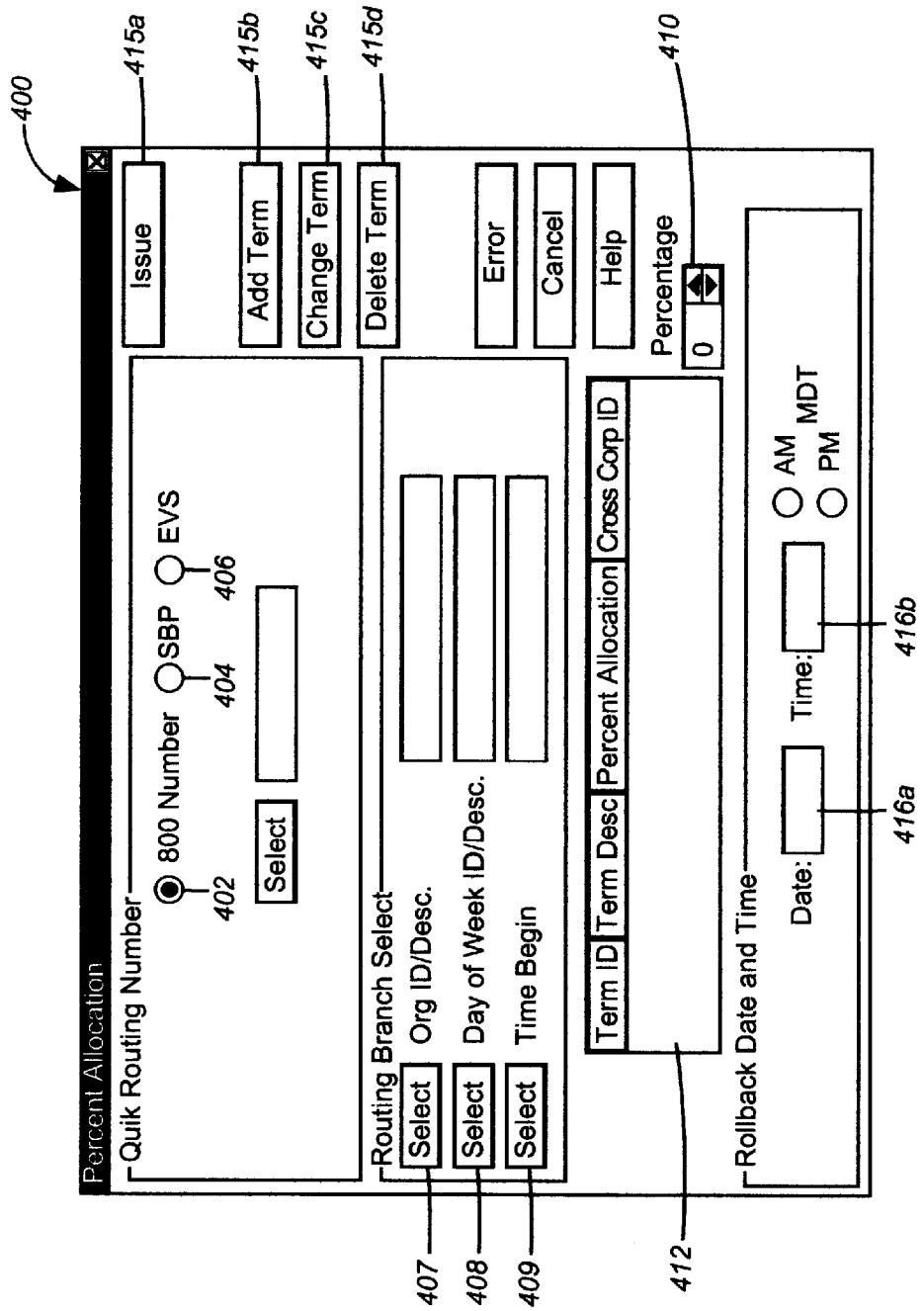
FIG. 13 illustrates an example QUIK dialog screen enabling the user to generate a TEMP QUIK/QUIK order for a desired Corp Id.

Referring back to FIG. 7, at step 340, the user may instead desire to execute the QUIK feature that enables customers to quickly add, change and/or delete one or more termination locations (nodes), and/or change the percentage allocation of two or more of these locations, for a currently implemented routing plan, FIG. 13 illustrates an exemplary web-page screen 400 instantiated by the TFNM client application for the QUIL/TEMP QUIK order process which is presented to the user. As shown in FIG. 13, there is provided a number of radio buttons which the user may select: 1) an 800/8xx number button 402 which causes a dialog to be displayed for enabling the user to enter or select an 800/8xx number from a list of 800/8xx #'s (not shown) having an associated "plan in use." Once the 800/8xx # is entered, the system returns the corresponding NLP or SRP Plan in use; 2) an SRP button 404 which causes a dialog to be displayed for enabling the user to enter or select an SRP Id from a list (not shown). Once entered, the system returns the SRP Routing Plan for the SRP Id; 3) an EVS button 406 which causes a dialog to be displayed for enabling the user to enter or select an EVS number. Once entered, the system returns an EVS Plan In Use if available. In each dialog, a corresponding "data controller" object is invoked for retrieving information from a TFNM database causing a corresponding dialog to appear enabling user selection.

After selecting the desired plan, the user is required to key or select each of the following buttons: Origination Id/Description 407, Day of Week Id/Desc. 408, and Time Begin/Desc. 409. Selection of the Origination Id/Description button 407 causes a list of Origination Id and corresponding descriptions to be displayed. In this manner a user may scroll through the list and identify the branch comprising the terminations that are to be modified. Likewise, selection of the Day of Week Id/Desc. button 408 causes a list of Day of Week node ids/descriptions to be displayed for the selected Origination Id node. and through which the user may scroll through and select for modification. Similarly, selection of the Time Begin button 409 causes a list of Time of Day node ids/descriptions to be displayed for the selected DOW and through which the user may scroll through and select for modification. Through use of the Order Manager classes/sub-classes the system auto-populates the Orig, DOW, TOD, and, once populated, the system displays in display field 412 the Lterms for the TOD node which comprise the terminations and percent allocations. In the preferred embodiment, the user may change percentage allocations by overtyping the amount or using the spin box up/down arrows 410 (increments of 1 percent). The user may additionally modify the percentages for the remaining termination(s) as long as the sum of the percentages for all the terminations attached to the selected Time interval node equals 100 percent. Action keys 415a–415d may additionally be enabled for user selection in accordance with enterprise business rules and/or user security. Specifically, key 415a enables the submission of the QUIK/TEMP QUIK order to NetCap for approval (Issue key). Key 415b allows the user to add a termination to the TOD node (including cross-corp terms that the customer has cross corp agreements with), or change the termination id, description, or percent allocated to the termination for this plan. Preferably, selection of key 415b enables display of a web page having a Termination screen enabling these choices. Key 415c enables the user to select the termination that the user wants replaced and presents the user with the Termination screen to select the term for change (Change Term key). The key 415d enables the user to select the term they want to delete on the selected routing branch. In the preferred embodiment, the system defaults effective date/time to the current date/time, however, the user may enter a future rollback date/time up to 1 year in the data and time entry fields 416a,b in FIG. 13. If the user enters a Rollback date/time in the rollback date fields, the system generates a TEMP QUIK order that sets the Routing Plan back to its state before the QUIK order. Preferably, the Rollback date/time may not be greater than 1 year in the future.

Thus, from the dialog box 400 (FIG. 13), the user is enabled to perform the following: 1) change one or more terminations for NLP or SRP; 2) replace one or more terminations on an EVS Routing Plan; 3) change the percent allocation of currently implemented NLP, EVS, or SRP Plan; 4) add one or more terminations to the currently implemented NLP or SRP Plan; 5) add one or more terminations to an EVS Routing Plan; and, 6) delete one or more terminations from the currently implemented plan of an NLP, EVS or SRP Plans. It should be understood that, in the case of a user implementing a TEMP QUIK request, the user selects the desired routing plan for the number/set, the desired date and time when they want to add, change and/or delete one or more termination locations and/or percentage allocation of these locations for a currently implemented routing plan, and, optionally, the roll back date and time when the changes are to revert back to their original settings. Thus, a QUIK and TEMP QUIK message pair is sent to the TFNM server for processing as described herein.

Referring back to FIG. 6, the customer's Send QUIK request 224 is communicated by the TFNM client applet by communication between the Dispatcher server 235 and the TFNM server objects using CORMI. The Object manager/sub-classes execute methods for translating the QUIK/TEMP QUIK order in a form suitable for submission to NetCap.

Appendix A also illustrates the Registry message calls that are transmitted from the TFNM server to NetCap for the QUIK/TEMP QUIK order and the corresponding NetCap responses. Included is the message for submitting an QUIK order (NQUIK) to NetCap.

Once the plan has been submitted to the TFNM server via the send QUIK message, the TFNM server receives the new routing plan and verifies the user's security with NetCap. Once the user's security has been verified, the TFNM server submits the QUIK request to NetCap 240 via Registry messaging.

After a TEMP QUIK and/or QUIK request has been transmitted to NetCap, it is stored for future implementation. In view of FIG. 6, NetCap sends a registry message to the TFNM server acknowledging that the request has been stored.

Appendix B also illustrates the Registry message calls that are transmitted to the TFNM server from NetCap in response to the submitted QUIK order. Included is the message indicating successful processing of the QUIK request (NSUCS) and the message indicating completion of the order in NetCap (UCOMP). The TFNM server then passes this information on to the user via CORMI messaging over the HTTPS connection. If the user is still logged on, this acknowledgment appears as a pop-up message on their screen, as indicated via line 226 in FIG. 6. If the user has logged off, TFNM retains the acknowledgment that the QUIK order has been received and saved for the next user logon. Likewise, when a QUIK has been transmitted to NetCap and either implemented or terminated, NetCap sends a registry message back to the TFNM server which, in turn, passes this information back to the user via CORMI.

As described, a change to a routing plan is saved locally before being submitted to NetCap. The submission happens when the plan changes are converted into an approved order having an approved order admin record and with a condition that NetCap has no preceding orders queued against the plan. The submission process takes place in two steps: first, the order admin record is sent to NetCap immediately, and second, when no orders are pending against the plan, the order admin detail record is then sent. The delay results because NetCap does not queue more than one order against a plan at a time. The TFNM server is configured to hide this limitation by stacking orders—a process of accepting multiple submissions and queuing them internally for later transmission to NetCap. The order admin record is sent immediately. The order admin detail record is sent soon as possible thereafter.

Figure 15:
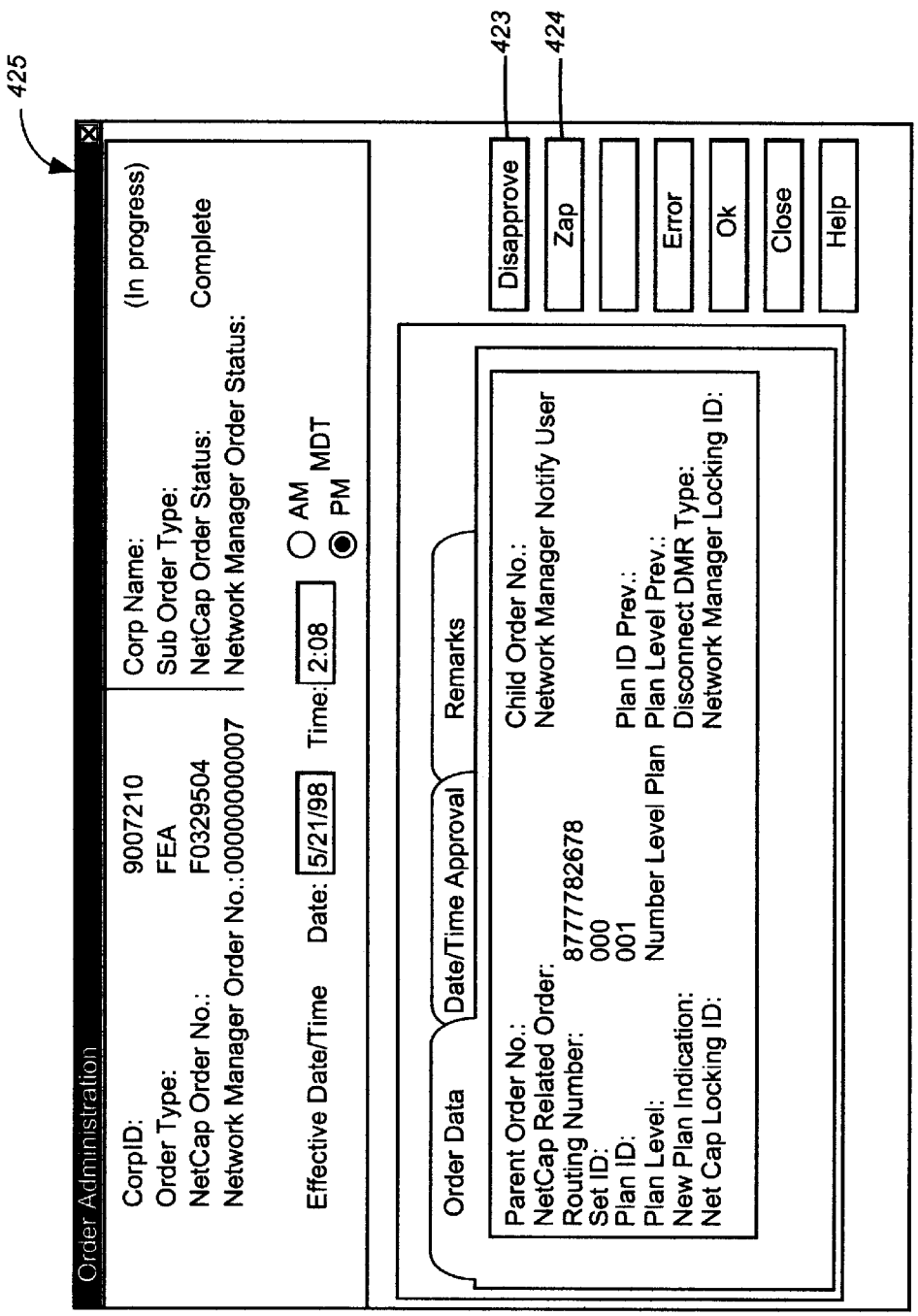
FIG. 15 illustrates an exemplary screen display showing the options for changing existing network plan routing orders.

Further functionality provided by the TFNM server is the ability to open plans, i.e., display a list of routing plans under the current working environment for display as a VORT (FIG. 11), or, view orders and filter through orders. Particularly, the TFNM client will instantiate the Order Manager object which instantiates order administration detail objects and other objects for retrieving administrative records comprising the details for a particular order in the TFNM database. For example, selection of the Report Order menu option shown in the screen display of FIG. 9(c), will cause the display of an order filter screen enabling a user to enter elements that they would like to use to query for orders and submit order queries. The results of an order query are displayed in an order select list 420, such as shown in FIG. 14. From this list, a user can retrieve details pertaining to an order, or, change an order's status or update remarks. Particularly, from an administration button 422, the user is presented with a dialog 425 as shown in FIG. 15, for example, enabling the user to update the order status and the effective date/time. It is from these dialogs that a user may select a button 423 to un-approve an order (if the selected order has been approved by NetCap) and, a button 424 to "zap" (delete) an existing order.

Appendix A illustrates the Registry message calls that are transmitted from the TFNM server to NetCap for un-approving an order (NOUAP), zapping an order (NOZAP), and, requesting pending order data (NPIUO). Corresponding NetCap responses are provided in Appendix B.

It should be understood that, in accordance with the principles described herein, the TFNM management tool of the invention is capable of supporting "feature" orders, i.e., functionality enabling customers to add a new TFN routing plan, e.g., NLP, SRP, URP, or EVS, or, change other the attributes or structure of an existing plan, e.g., changing attributes of a routing plan directly from the VORT (FIG. 11). The TFNM tool additionally may provide "drag and drop" enabling users to configure routing elements between plans.

The foregoing merely illustrates the principles of the present invention. Those skilled in the art will be able to devise various modifications, which although not explicitly described or shown herein, embody the principles of the invention and are thus within its spirit and scope. For instance, although, the web/Internet network management tool described herein is described with respect to customer's toll-free, e.g., 1-800/8xx networks, the principles may be readily applied to other types of telecommunications networks.

What is claimed is:

1. An interactive Web/Internet based network management system for enabling configuration of a customer's telecommunications network via an integrated interface, said system comprising:
    a client browser application located at a client workstation for enabling interactive Web based communications with said network management system, said client workstation identified with a customer and providing said integrated interface;
    at least one secure server for managing client sessions over the Internet, said secure server supporting a secure connection enabling encrypted communication between said client browser application and said secure server;
    a network configuration system for maintaining an inventory of a customer's telecommunications network call routing plans and associated plan details, and interfacing with network control elements for configuring a customer's telecommunications network according to a desired call routing plan; and,
    a network manager in communication with said secure server for receiving customer directives communicated over said secure connection via the client browser application, said directives including a request to access call routing plan details according to a selected plan, and downloading said call routing plans details including a call routing tree to customers over said secure communications link for visual presentation at said client workstation.

2. The interactive Web/Internet based network management system as claimed in claim 1, wherein said client browser application enables customer modification of said call-routing plan details via said integrated interface and up-loading plan detail modification directives to said network manager over said secure connection, said network manager translating said received modification directives into commands for input to said network configuration system and forwarding said commands to said network configuration system.

3. The interactive Web/Internet based network management system as claimed in claim 2, wherein said customer request messages include unique customer identifiers enabling downloading of specific call routing plan details.

4. The interactive Web/Internet based network management system as claimed in claim 3, wherein said call routing plans pertain to a customer's toll-free call network, said unique customer identifier including a corporate identifier having one or more call routing plans associated therewith.

5. The interactive Web/Internet based network management system as claimed in claim 3, wherein said call routing plans pertain to a customer's toll-free call network, said unique customer identifier including a specific toll-free number having one or more call routing plans associated therewith.

6. The interactive Web/Internet based network management system as claimed in claim 5, wherein modifiable call routing plan details include one selected from the group of: origin, country, state, day of week, time of day and termination, and any combination thereof.

7. The interactive Web/Internet based network management system as claimed in claim 2, wherein said customer directive includes an order to temporarily modify an existing network call routing plan for a predetermined period of time.

8. The interactive Web/Internet based network management system as claimed in claim 7, wherein said customer directive enables said call routing plan to automatically revert to a corresponding call routing plan configured prior to invocation of said directive, said directive including a revert date and time.

9. The interactive Web/Internet based network management system as claimed in claim 2, wherein said customer directive includes an order to temporarily modify a percent allocation of call traffic routed to a number used in a particular routing plan.

10. The interactive Web/Internet based network management system as claimed in claim 9, wherein said customer directive enables said allocation of call traffic routed to a number to automatically revert to a corresponding percent allocation prior to invocation of said directive, said directive including a reverting date and time.

11. The interactive Web/Internet based network management system as claimed in claim 9, wherein said directives are communicated from said integrated interface over said secure connection to said network manager by a remote method invocation-like protocol.

12. The interactive Web/Internet based network management system as claimed in claim 2, wherein said client browser application includes process for enabling construction of a new routing plan associated with a telephone number.

13. The interactive Web/Internet based network management system as claimed in claim 2, wherein said network manager further comprises process for verifying customer entitlements prior to downloading call routing plans details to said requesting customer.

14. A Web/Internet based network management system for enabling configuration of a customer's telecommunications network via an integrated interface, said system comprising:
    a client browser application located at a client workstation for enabling interactive Web based communications with said network management system, said client workstation identified with a customer and providing said integrated interface;
    at least one secure server for managing client sessions over the Internet, said secure server supporting a secure connection enabling encrypted communication between said browser client application and said secure server; and
    at least one secure server for managing client sessions over the Internet, said secure server supporting a secure connection enabling encrypted communication between a client browser application located at a client workstation and said secure server; and
    network manager for receiving customer directives communicated over said secure communications link, said directives including a request to access call routing plan information relating to a customer's network, said network manager downloading said call routing plan information including a call routing tree to customers over said secure connection, said client browser application enabling customer modification of said call-routing plan information via said integrated interface and up-loading call routing plan modification directives to said network manager over said secure connection, whereby said customer's telecommunications network is thereafter configured according to said commands and modified call-routing plan details included therein.

15. The interactive Web/Internet based network management system as claimed in claim 14, wherein said customer request messages include unique customer identifiers enabling downloading of specific call routing plan information.

16. The interactive Web/Internet based network management system as claimed in claim 15, wherein said call routing plans pertain to a customer's toll-free call network, said unique customer identifier including a specific toll-free number having one or more call routing plans associated therewith.

17. The interactive Web/Internet based network management system as claimed in claim 15, wherein said call routing plans pertain to a customer's toll-free call network, said unique customer identifier including a corporate identifier having one or more call routing plans associated therewith.

18. The interactive Web/Internet based network management system as claimed in claim 15, wherein said customer directive includes an order to temporarily modify a percent allocation of call traffic routed to a number used in a particular routing plan.

19. The interactive Web/Internet based network management system as claimed in claim 18, wherein said customer directive enables said allocation of call traffic routed to a number to automatically revert to a corresponding percent allocation prior to invocation of said directive, said directive including a reverting date and time.

20. The interactive Web/Internet based network management system as claimed in claim 14, wherein said customer directive includes an order to temporarily modify an existing network call routing plan for a predetermined period of time.

21. The interactive Web/Internet based network management system as claimed in claim 20, wherein said customer directive enables said call routing plan to automatically revert to a corresponding call routing plan configured prior to invocation of said directive, said directive including a revert date and time.

22. A method for remotely configuring a customer's telecommunications network via a Web/Internet integrated interface, said integrated interface including a client browser application located at a client workstation for enabling interactive Web based communications between said customer and said integrated interface, said method comprising:

managing a client session over the Web/Internet by providing a first server device capable of supporting a first secure connection enabling encrypted communication between said browser application and said first server device;

providing a second server device for communicating with said first server device through a firewall over a second socket connection, said first secure and second sockets forming a secure communications link;

receiving customer directives communicated over said secure communications link, said directives including a request to access call routing plan information relating to a customer's network;

downloading said call routing plan information including a call routing tree to customers over said secure communications link; and modifying said call-routing plan information via said integrated interface and up-loading call routing plan modification directives to a network manager over said secure communications link, whereby said customer's telecommunications network is thereafter configured according to said commands and modified call-routing plan details included therein.

23. The method as claimed in claim 22, further including the step of enabling customer modification of said call-routing plan details via said integrated interface and up-loading plan modification directives over said secure communications link to a telecommunications network manager for receiving said directives, and translating said plan modification directives into a format capable of configuring said customer's telecommunications network, said modified call-routing plan details being forwarded to said interfacing system for configuring said customer's telecommunications network according to said modified call-routing plan details.

24. The method as claimed in claim 23, wherein said customer directive includes an order to temporarily modify an existing network call routing plan for a predetermined period of time.

25. The method as claimed in claim 24, wherein said customer directive enables said call routing plan to automatically revert to a corresponding call routing plan configured prior to invocation of said directive, said directive including a revert date and time.

26. The method as claimed in claim 23, wherein said customer request messages include unique customer identifiers enabling downloading of specific call routing plan details.

27. The method as claimed in claim 26, wherein said customer directive includes an order to temporarily modify a percent allocation of call traffic routed to a number used in a particular routing plan.

28. The method as claimed in claim 27, wherein said customer directive enables said allocation of call traffic routed to a number to automatically revert to a corresponding percent allocation prior to invocation of said directive, said directive including a reverting date and time.

29. The method as claimed in claim 28, wherein modifiable call routing plan details include one selected from the group of: origin, country, state, day of week, time of day and termination, and any combination thereof.

30. The method as claimed in claim 23, wherein said call routing plans pertain to a customer's toll-free call network, said unique customer identifier including a specific toll-free number having one or more call routing plans associated therewith.

31. The method as claimed in claim 30, wherein said call routing plans pertain to a customer's toll-free call network, said unique customer identifier including a corporate identifier having one or more call routing plans associated therewith.

32. The method as claimed in claim 30, further including constructing a new toll free routing plan associated with a new toll free telephone number.

33. The method as claimed in claim 22, wherein prior to said step of downloading said call routing plan and call routing plan details as response messages to customers, the step of verifying customer entitlements for accessing said call routing plans details.

34. A method for remotely configuring a customer's telecommunications network via a Web/Internet based integrated interface, said integrated interface including a client browser application located at a client workstation for enabling interactive Web based communications between said customer and said integrated interface, said method comprising:

managing a client session over the Web/Internet by providing a first server device capable of supporting a first secure socket connection enabling encrypted communication between said browser application and said first server device;

providing a second server device for communicating with said first server device through a firewall over a second socket connection, said first secure and second sockets forming a secure communications link;

receiving customer directives communicated over said secure communications link, said directives including a request to access call routing plan information relating to a customer's network;

downloading said call routing plan information to customers over said secure communications link; and modifying said call-routing plan information via said integrated interface and up-loading call routing plan modification directives to a network manager over said secure communications link, whereby said customer's telecommunications network is thereafter configured according to said commands and modified call-routing plan details included therein.

* * * * *